(12) United States Patent
Watanabe

(10) Patent No.: US 12,343,597 B2
(45) Date of Patent: Jul. 1, 2025

(54) MULTI-PIECE SOLID GOLF BALL

(71) Applicant: BRIDGESTONE SPORTS CO., LTD., Tokyo (JP)

(72) Inventor: Hideo Watanabe, Chichibu (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 12 days.

(21) Appl. No.: 18/471,429

(22) Filed: Sep. 21, 2023

(65) Prior Publication Data

US 2024/0100401 A1    Mar. 28, 2024

(30) Foreign Application Priority Data

Sep. 26, 2022   (JP) ................. 2022-152311

(51) Int. Cl.
| | | |
|---|---|---|
| A63B 37/06 | (2006.01) | |
| A63B 37/00 | (2006.01) | |
| C08K 13/02 | (2006.01) | |

(52) U.S. Cl.
CPC ...... *A63B 37/0084* (2013.01); *A63B 37/0047* (2013.01); *A63B 37/0065* (2013.01); *A63B 37/0068* (2013.01); *A63B 37/0076* (2013.01); *A63B 37/0082* (2013.01); *A63B 37/00922* (2020.08); *C08K 13/02* (2013.01)

(58) Field of Classification Search
CPC .......... A63B 37/0084; A63B 37/00922; A63B 37/0068; A63B 37/0076
See application file for complete search history.

(56) References Cited

U.S. PATENT DOCUMENTS

| | | |
|---|---|---|
| 2004/0142770 A1 | 7/2004 | Watanabe |
| 2007/0281802 A1 | 12/2007 | Watanabe et al. |
| 2007/0287557 A1 | 12/2007 | Watanabe et al. |
| 2008/0102987 A1 | 5/2008 | Watanabe et al. |
| 2009/0111610 A1 | 4/2009 | Watanabe et al. |
| 2014/0194221 A1 | 7/2014 | Watanabe et al. |

(Continued)

FOREIGN PATENT DOCUMENTS

| | | |
|---|---|---|
| JP | 2004-097802 A | 4/2004 |
| JP | 2007-319667 A | 12/2007 |

(Continued)

*Primary Examiner* — Raeann Gorden
(74) *Attorney, Agent, or Firm* — Sughrue Mion, PLLC

(57) ABSTRACT

The golf ball includes a core having an inner layer core and an outer layer core, a single-layered intermediate layer and cover, wherein the inner layer core is formed of a rubber composition, the intermediate layer and the cover are formed of a resin composition, and a relationship between an initial velocity of the inner layer core, an initial velocity of the entire core, an initial velocity of an intermediate layer-encased sphere, and an initial velocity of a ball satisfies the following conditions:

(initial velocity of ball)<(initial velocity of intermediate layer-encased sphere)

(initial velocity of intermediate layer-encased sphere)−(initial velocity of entire core)≤0.70 (m/s)

(initial velocity of entire core)−(initial velocity of inner layer core)≥0.20 (m/s)

and a specific gravity of the intermediate layer and a deflection of the golf ball when compressed under a predetermined load are set within specific ranges.

10 Claims, 4 Drawing Sheets

(56) References Cited

U.S. PATENT DOCUMENTS

| | | | |
|---|---|---|---|
| 2015/0258388 A1* | 9/2015 | Watanabe | A63B 37/0047 473/373 |
| 2016/0008667 A1* | 1/2016 | Watanabe | A63B 37/0084 473/376 |
| 2016/0151677 A1 | 6/2016 | Watanabe et al. | |
| 2016/0151679 A1* | 6/2016 | Watanabe | C08K 5/098 473/376 |
| 2016/0175661 A1* | 6/2016 | Watanabe | A63B 37/0084 473/376 |
| 2017/0182372 A1* | 6/2017 | Watanabe | A63B 37/0068 |
| 2021/0162267 A1* | 6/2021 | Watanabe | A63B 37/009 |

FOREIGN PATENT DOCUMENTS

| | | |
|---|---|---|
| JP | 2007-330789 A | 12/2007 |
| JP | 2008-068077 A | 3/2008 |
| JP | 2009-095358 A | 5/2009 |
| JP | 2009-095364 A | 5/2009 |
| JP | 2012-071163 A | 4/2012 |
| JP | 2014-132955 A | 7/2014 |
| JP | 2016-101254 A | 6/2016 |
| JP | 2016-101256 A | 6/2016 |
| JP | 2016-116627 A | 6/2016 |

* cited by examiner

MULTI-PIECE SOLID GOLF BALL

CROSS-REFERENCE TO RELATED APPLICATIONS

This non-provisional application claims priority under 35 U.S.C. § 119(a) on Patent Application No. 2022-152311 filed in Japan on Sep. 26, 2022, the entire contents of which are hereby incorporated by reference.

TECHNICAL FIELD

The present invention relates to a multi-piece solid golf ball composed of at least four layers including a multi-layer core having at least an inner layer core and an outer layer core, a single-layer intermediate layer, and a single-layer cover.

BACKGROUND ART

Many innovations have been made in designing golf balls with a multilayer construction, and many balls that satisfy not only professional golfers but also general amateur golfers from beginners to advanced players have been developed to date. For example, functional multi-piece solid golf balls in which a material hardness and a surface hardness of each layer of a core, a surrounding layer, an intermediate layer, and a cover (outermost layer) are optimized have been widely used. Some technologies have been proposed to provide high-performance golf balls by designing a core internal hardness in various aspects while focusing on a core hardness profile occupying most of the volume of the ball.

Examples of such technical documents include the following Patent Documents 1 to 11. These golf balls are golf balls having a multilayer construction of at least four layers, and have optimized cores, intermediate layer-encased spheres, and ball surface hardnesses.

However, although some of the proposed golf balls have been disclosed regarding the initial velocity of each of the core, the intermediate layer-encased sphere, and each encased sphere of the ball, none have been invented so as to improve a golf ball in which a superior distance can be obtained on shots with a driver (W #1) in a wide range of golf users from those with an average head speed to advanced players with power, and that has controllability on approach shots and excellent striking durability.

CITATION LIST

Patent Document 1: JP-A 2004-097802
Patent Document 2: JP-A 2007-319667
Patent Document 3: JP-A 2007-330789
Patent Document 4: JP-A 2008-068077
Patent Document 5: JP-A 2009-095358
Patent Document 6: JP-A 2009-095364
Patent Document 7: JP-A 2012-071163
Patent Document 8: JP-A 2014-132955
Patent Document 9: JP-A 2016-101254
Patent Document 10: JP-A 2016-101256
Patent Document 11: JP-A 2016-116627

SUMMARY OF THE INVENTION

The present invention has been made in view of the above circumstances, and an object of the present invention is to provide a golf ball that can obtain a superior distance on shots with a driver (W #1) in a wide range of golf users from those with an average head speed to advanced players with power, has good controllability on approach shots, and imparts excellent durability on repeated impact.

As a result of intensive studies to achieve the above object, the present inventor has found that in a multi-piece solid golf ball including a multi-layer core having at least an inner layer core and an outer layer core, a single-layer intermediate layer, and a single-layer cover, a relationship between an initial velocity of the inner layer core, an initial velocity of an entire core, an initial velocity of a sphere (intermediate layer-encased sphere) obtained by encasing the core with the intermediate layer, and an initial velocity of a sphere (ball) obtained by encasing the intermediate layer-encased sphere with the cover satisfies the following three conditions:

(initial velocity of ball)<(initial velocity of intermediate layer-encased sphere)

(initial velocity of intermediate layer-encased sphere)−(initial velocity of entire core)≤0.70 (m/s), and (initial velocity of entire core)−(initial velocity of inner layer core)≥0.20 (m/s).

Further, the present inventor has found that by setting a specific gravity of the intermediate layer to at least 1.05 and setting a deflection (mm) to not more than 3.0 mm when the golf ball is compressed under a final load of 1,275 N (130 kgf) from an initial load of 98 N (10 kgf), a superior distance on shots with a driver (W #1) in a wide range of golf users from those with an average head speed to advanced players with power, controllability on approach shots and excellent striking durability can be obtained, and thus has completed the present invention.

In the present invention, "those with an average head speed" refers to a golfer whose head speed on shots with a driver (W #1) is about 40 m/s, and "advanced players with power" refers to a golfer whose head speed on shots with a driver (W #1) is at least 43 m/s. Therefore, golfers with a low head speed of not more than 35 m/s are not included in "those with an average head speed" described above. The golf ball of the present invention has a greater effect, particularly from those with an average head speed to advanced players with power.

Accordingly, the present invention provides a multi-piece solid golf ball including a multi-layer core having at least an inner layer core and an outer layer core, a single-layer intermediate layer, and a single-layer cover, wherein the inner layer core is formed of a rubber composition, the intermediate layer and the cover are both formed of a resin composition, and a relationship among an initial velocity of the inner layer core, an initial velocity of the entire core, an initial velocity of a sphere (intermediate layer-encased sphere) obtained by encasing the intermediate layer with the core, and an initial velocity of a sphere (ball) obtained by encasing the intermediate layer-encased sphere with the cover satisfies the following three conditions:

(initial velocity of ball)<(initial velocity of intermediate layer-encased sphere), (initial velocity of intermediate layer-encased sphere)−(initial velocity of entire core)≤0.70 (m/s), and (initial velocity of entire core)−(initial velocity of inner layer core)≥0.20 (m/s).

Further characteristics of the multi-piece solid golf ball are that a specific gravity of the intermediate layer is at least 1.05, and a deflection (mm) when the golf ball is compressed under a final load of 1,275 N (130 kgf) from an initial load of 98 N (10 kgf) is not more than 3.0 mm.

In a preferred embodiment of the multi-piece golf ball according to the invention, the following condition is satisfied:

$$0.50 \leq (\text{initial velocity of entire core}) - (\text{initial velocity of inner layer core}) \leq 1.00 \text{ (m/s)}.$$

In another preferred embodiment of the inventive golf ball, the following condition is satisfied:

ball surface hardness<surface hardness of intermediate layer-encased sphere>outer layer core surface hardness>inner layer core surface hardness (where the surface hardness of each sphere means Shore C hardness).

In yet another preferred embodiment, the intermediate layer contains an inorganic particulate filler.

In still another preferred embodiment, a difference between a specific gravity of the cover and the specific gravity of the intermediate layer is not more than 0.15.

In a further preferred embodiment, the resin composition of the intermediate layer contains a high-acid ionomer resin having an acid content of at least 16 wt %.

In a yet further preferred embodiment, the outer layer core is formed of a resin composition.

In a still further preferred embodiment, the following condition is satisfied:

cover thickness<intermediate layer thickness≤outer layer core thickness.

In another preferred embodiment, the core has a hardness profile in which, letting the Shore C hardness at a core center be Cc, the Shore C hardness at a midpoint M between the core center and a core surface be $C_m$, the Shore C hardnesses at positions 2 mm, 4 mm, and 6 mm inward from the midpoint M be Cm−2, Cm−4, and Cm−6 respectively, the Shore C hardnesses at positions 2 mm, 4 mm, and 6 mm outward from the midpoint M be Cm+2, Cm+4, and Cm+6 respectively, and the Shore C hardness at the core surface be Cs, and defining surface areas A to F as follows:

½×2×(Cm−4−Cm−6)   surface area A:

½×2×(Cm−2−Cm−4)   surface area B:

½×2×(Cm−Cm−2)    surface area C:

½×2×(Cm+2−Cm)    surface area D:

½×2×(Cm+4−Cm+2)  surface area E:

½×2×(Cm+6−Cm+4)  surface area F:

the following condition is satisfied:

(surface area E+surface area F)−(surface area A+surface area B)≥1.0.

In yet another preferred embodiment, the following condition is satisfied:

1.00≤(initial velocity of intermediate layer-encased sphere)−(initial velocity of inner layer core)≤1.60 (m/s).

In still another preferred embodiment, the following condition is satisfied:

[surface hardness of intermediate layer-encased sphere(Shore C)−center hardness of inner layer core(Shore C)]≥35.

Advantageous Effects of the Invention

With the golf ball according to the present invention, in particular, in a wide range of golf users from those with an average head speed to advanced players with power, a superior distance may be obtained on shots with a driver (W #1), a spin rate of the ball on approach shots is high, and short game playability is excellent. Furthermore, the golf ball according to the present invention has excellent durability on repeated impact.

DETAILED DESCRIPTION OF THE INVENTION

Hereinafter, the present invention is described in more detail.

Figure 1:
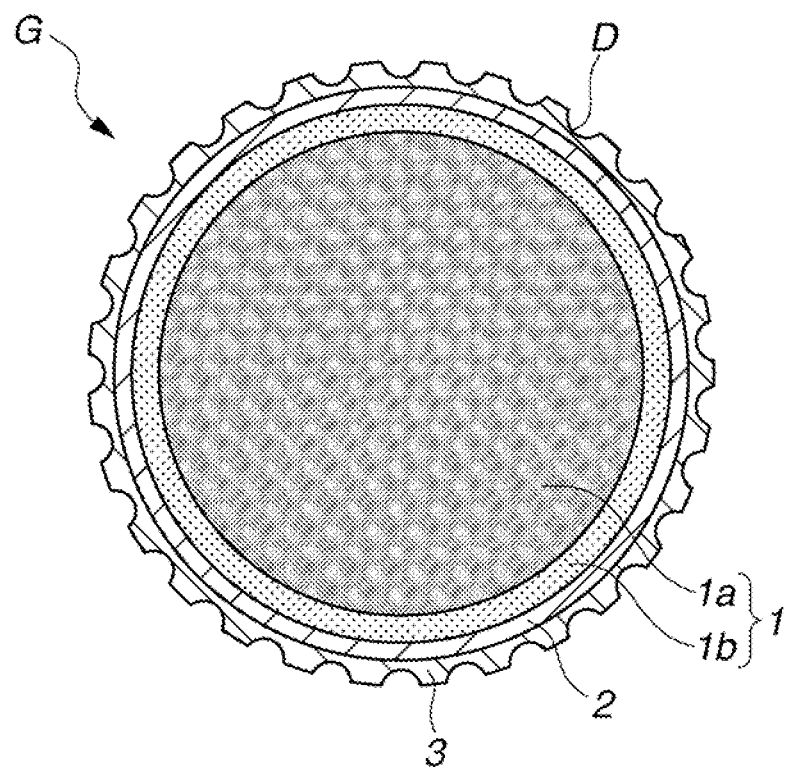
FIG. 1 is a schematic cross-sectional view of a golf ball according to one embodiment of the present invention.

As shown in FIG. 1, a multi-piece solid golf ball of the present invention is a golf ball G having at least four multilayers including a core 1 having an inner layer core 1a and an outer layer core 1b, an intermediate layer 2 encasing the core, and a cover 3 encasing the intermediate layer. A large number of dimples D are typically formed on the surface of the cover 3. In addition, although not particularly illustrated, a coating film layer is typically formed by coating on the surface of the cover 3. The cover 3 is positioned at the outermost layer in the layer structure of the golf ball except for the coating film layer. The core 1 is formed in a plurality of layers of at least two layers, and the intermediate layer 2 and the cover 3 are formed in a single layer.

The inner layer core is obtained by vulcanizing a rubber composition containing a rubber material as a chief material. If the inner layer core material is not a rubber composition, the rebound of the core may become low, and as a result, a good distance of the ball may not be achieved. This rubber composition typically contains a base rubber as a chief material, and is obtained with the inclusion of a co-crosslinking agent, a crosslinking initiator, an inert filler, an organosulfur compound, or the like.

As the base rubber, polybutadiene is preferably used. As the type of polybutadiene, a commercially available product may be used, and examples thereof include BR01, BR51, and BR730 (manufactured by JSR Corporation). The proportion of polybutadiene in the base rubber is preferably at least 60 wt %, and more preferably at least 80 wt %. In addition to the polybutadiene, other rubber components are included in the base rubber as long as the effect of the present invention is not impaired. Examples of the rubber component other than the polybutadiene include a polybutadiene other than the polybutadiene described above, and other diene rubbers such as styrene-butadiene rubber, natural rubber, isoprene rubber, and ethylene-propylene-diene rubber.

The co-crosslinking agent is an α,β-unsaturated carboxylic acid and/or a metal salt thereof. Specific examples of the unsaturated carboxylic acid include acrylic acid, methacrylic acid, maleic acid, fumaric acid, or the like, and in particular, acrylic acid and methacrylic acid are preferably used. The metal salt of the unsaturated carboxylic acid is not particularly limited, and examples thereof include those obtained by neutralizing the unsaturated carboxylic acid with a desired metal ion. Specific examples thereof include zinc salts and magnesium salts such as methacrylic acid and acrylic acid, and in particular, zinc acrylate is preferably used.

The unsaturated carboxylic acid and/or the metal salt thereof is typically blended in an amount of at least 5 parts by weight, preferably at least 9 parts by weight, and even more preferably at least 13 parts by weight, and the upper limit is typically not more than 60 parts by weight, preferably not more than 50 parts by weight, and even more preferably not more than 40 parts by weight per 100 parts by weight of the base rubber. If the compounding amount is too large, the core may become too hard, giving the ball an unpleasant feel at impact, and if the compounding amount is too small, rebound may become low.

As the crosslinking initiator, an organic peroxide is preferably used. Specifically, commercially available organic peroxides may be used, and for example, Percumyl D, Perhexa C-40, Perhexa 3M (all manufactured by NOF Corporation), and Luperco 231XL (manufactured by Ato-Chem Corporation) may be suitably used. These may be used singly, or two or more may be used in combination. The compounding amount of the organic peroxide is preferably at least 0.1 parts by weight, more preferably at least 0.3 parts by weight, and even more preferably at least 0.5 parts by weight, and the upper limit is preferably not more than 5 parts by weight, more preferably not more than 4 parts by weight, even more preferably not more than 3 parts by weight, and most preferably not more than 2.5 parts by weight per 100 parts by weight of the base rubber. If the compounding amount is too large or too small, it may not be possible to obtain suitable feel at impact, durability, and rebound.

As a filler, for example, zinc oxide, barium sulfate, calcium carbonate, or the like may be suitably used. These may be used singly, or two or more may be used in combination. The compounding amount of the filler is preferably at least 1 part by weight, and more preferably at least 3 parts by weight per 100 parts by weight of the base rubber. In addition, an upper limit of the compounding amount is preferably not more than 50 parts by weight, more preferably not more than 40 parts by weight, and even more preferably not more than 30 parts by weight per 100 parts by weight of the base rubber. If the compounding amount is too large or too small, it may not be possible to obtain an appropriate weight and a suitable rebound.

As an antioxidant, for example, commercially available products such as Nocrac NS-6, Nocrac NS-30, Nocrac NS-200, and Nocrac MB (all manufactured by Ouchi Shinko Chemical Industrial Co., Ltd.) may be employed. These may be used singly, or two or more may be used in combination.

The compounding amount of the antioxidant, although not particularly limited, is preferably at least 0.05 parts by weight, and more preferably at least 0.1 parts by weight, and the upper limit is preferably not more than 1.0 part by weight, more preferably not more than 0.7 parts by weight, and even more preferably not more than 0.5 parts by weight per 100 parts by weight of the base rubber. If the compounding amount is too large or too small, a suitable inner layer core hardness gradient cannot be obtained, and it may not be possible to obtain suitable rebound, durability, and a spin rate-lowering effect on full shots.

Furthermore, an organosulfur compound is included in the rubber composition in order to impart an excellent rebound. Specifically, it is recommended to include thiophenol, thionaphthol, halogenated thiophenol, or a metal salt thereof. More specifically, examples of the organosulfur compound include zinc salts such as pentachlorothiophenol, pentafluorothiophenol, pentabromothiophenol, p-chlorothiophenol, and pentachlorothiophenol, and any of the following having 2 to 4 sulfur atoms: diphenylpolysulfide, dibenzylpolysulfide, dibenzoylpolysulfide, dibenzothiazoylpolysulfide, and dithiobenzoylpolysulfide. In particular, diphenyldisulfide and the zinc salt of pentachlorothiophenol is preferably used.

The organosulfur compound is blended in an amount of not more than 5 parts by weight, preferably not more than 4 parts by weight, more preferably not more than 3 parts by weight, and most preferably not more than 2 parts by weight per 100 parts by weight of the base rubber. If the compounding amount is too large, the hardness becomes too soft, and if the compounding amount is too small, the rebound may not be expected to be improved.

Water may be included in the rubber composition. This water, although not particularly limited, may be distilled water or tap water, but it is particularly suitable to employ distilled water free of impurities. The compounding amount of the water included per 100 parts by weight of the base rubber is preferably at least 0.1 parts by weight, and more preferably at least 0.2 parts by weight, and the upper limit is preferably not more than 2 parts by weight, and more preferably not more than 1.5 parts by weight.

By blending the water or a material containing water directly into the inner layer core material, decomposition of the organic peroxide during the inner layer core formulation may be promoted. In addition, it is known that the decomposition efficiency of the organic peroxide in the core-forming rubber composition changes depending on temperature, and the decomposition efficiency increases as the temperature becomes higher than a certain temperature. If the temperature is too high, the amount of decomposed radicals becomes too large, and the radicals are recombined or deactivated. As a result, fewer radicals act effectively in crosslinking. Here, when decomposition heat is generated by the decomposition of the organic peroxide at the time of the inner layer core vulcanization, a temperature near the inner layer core surface is maintained at substantially the same level as a temperature of a vulcanization mold, but a temperature around the inner layer core center is considerably higher than the mold temperature due to an accumulation of decomposition heat by the organic peroxide decomposing from the outside. If the water or a material containing water is directly included in the inner layer core, the water acts to promote the decomposition of the organic peroxide, so that the radical reactions as described above may be changed at the inner layer core center and the inner layer core surface. That is, the decomposition of the organic peroxide is further promoted near the inner layer core center, and the deactivation of radicals is further promoted, so that the amount of active radicals is further reduced, and as a result, a core can be obtained in which the crosslink densities at the inner layer core center and the inner layer core surface differ markedly.

The inner layer core may be manufactured by vulcanizing and curing the rubber composition containing the above components. For example, a molded body can be manufactured by intensively mixing the rubber composition using a mixing apparatus such as a Banbury mixer or a roll mill, subsequently compression molding or injection molding the mixture using a core mold, and curing the resulting molded body by appropriately heating it at a temperature sufficient for the organic peroxide or the co-crosslinking agent to act, such as at a temperature of 100 to 200° C., and preferably at a temperature of 140 to 180° C., for 10 to 40 minutes.

In the present invention, the inner layer core is formed as a single layer or a plurality of layers, although it is preferably formed as a single layer. If the rubber inner layer core is produced as a plurality of layers of rubber, in a case where a difference in hardness between the interfaces of these rubber layers is large, layer separation at the interface may arise when the ball is repeatedly struck, possibly leading to a loss in the initial velocity of the ball on full shots.

The diameter of the inner layer core is preferably at least 35.1 mm, more preferably at least 35.3 mm, and even more preferably at least 35.4 mm. The upper limit of the diameter of the inner layer core is preferably not more than 41.3 mm, more preferably not more than 39.2 mm, and even more preferably not more than 38.3 mm. If the diameter of the inner layer core is too small, the initial velocity of the ball may become low, or the deflection of an entire ball may become small, a spin rate of the ball on full shots rises, and an intended distance may not be attainable. On the other hand, if the diameter of the inner layer core is too large, the spin rate on full shots may rise, and the intended distance may not be attainable, or a durability to cracking on repeated impact may worsen.

The deflection (mm) when the inner layer core is compressed under a final load of 1,275 N (130 kgf) from an initial load of 98 N (10 kgf), although not particularly limited, is preferably at least 2.9 mm, more preferably at least 3.2 mm, and even more preferably at least 3.5 mm, and the upper limit thereof is preferably not more than 4.6 mm, more preferably not more than 4.3 mm, and even more preferably not more than 4.0 mm. If the deflection of the inner layer core is too small, that is, if the inner layer core is too hard, the spin rate of the ball may rise excessively, and a good distance may not be achieved, or the feel at impact may be excessively hard. On the other hand, if the deflection of the inner layer core is too large, that is, if the inner layer core is too soft, the ball rebound may become too low and a good distance may not be achieved, the feel at impact may be too soft, or the durability to cracking on repeated impact may worsen.

Next, the inner layer core hardness profile is described. The hardness of the core described below means Shore C hardness. The Shore C hardness is a hardness value measured with a Shore C durometer conforming to the ASTM D2240 standard.

A core center hardness (Cc) is preferably at least 50, more preferably at least 52, and even more preferably at least 54, and the upper limit is preferably not more than 61, more preferably not more than 59, and even more preferably not more than 57. When this value is too large, the feel at impact becomes hard, or the spin rate of the ball on full shots rises, and the intended distance may not be attainable. On the other hand, when the above value is too small, the rebound becomes low and a good distance is not achieved, or the durability to cracking on repeated impact may worsen.

A hardness (Cm−6) at a position 6 mm inward from the point M (hereinafter, also referred to as "midpoint M") between the core center and the core surface, although not particularly limited, may be preferably at least 51, more preferably at least 53, and even more preferably at least 55, and the upper limit is also not particularly limited, and may be preferably not more than 61, more preferably not more than 59, and even more preferably not more than 57. Hardnesses that deviate from these values may lead to undesirable results similar to those described above for the core center hardness (Cc).

A hardness (Cm−4) at a position 4 mm inward from the point M (hereinafter, also referred to as "midpoint M") between the core center and the core surface, although not particularly limited, may be preferably at least 52, more preferably at least 54, and even more preferably at least 56, and the upper limit is also not particularly limited, and may be preferably not more than 63, more preferably not more than 61, and even more preferably not more than 59. Hardnesses that deviate from these values may lead to undesirable results similar to those described above for the core center hardness (Cc).

Although not particularly limited, a hardness (Cm−2) at a position 2 mm inward from the midpoint M of the core may be preferably at least 53, more preferably at least 55, and even more preferably at least 57, and the upper limit is also not particularly limited, and may be preferably not more than 63, more preferably not more than 61, and even more preferably not more than 59. Hardnesses that deviate from these values may lead to undesirable results similar to those described above for the core center hardness (Cc).

A cross-sectional hardness (Cm) at the midpoint M of the core, although not particularly limited, may be preferably at least 55, more preferably at least 57, and even more preferably at least 59. In addition, the upper limit, although not particularly limited, may be preferably not more than 66, more preferably not more than 64, and even more preferably not more than 62. Hardnesses that deviate from these values may lead to undesirable results similar to those described above for the core center hardness (Cc).

A core surface hardness (Cs) is preferably at least 78, more preferably at least 80, and even more preferably at least 82, and the upper limit is preferably not more than 90, more preferably not more than 88, and even more preferably not more than 86. When this value is too large, the durability to cracking on repeated impact may worsen, or the feel at impact may become too hard. On the other hand, when the above value is too small, the rebound becomes low and a good distance is not achieved, or the spin rate of the ball on full shots rises, and the intended distance may not be attainable.

A hardness (Cm+2) at a position 2 mm outward toward the core surface (hereinafter, simply referred to as "outward") from the midpoint M of the core toward the core surface, although not particularly limited, may be preferably at least 60, more preferably at least 62, and even more preferably at least 64. The upper limit is also not particularly limited, and may be preferably not more than 71, more preferably not more than 69, and even more preferably not more than 67. Hardnesses that deviate from these values may lead to undesirable results similar to those described above for the core surface hardness (Cs).

A hardness (Cm+4) at a position 4 mm outward from the midpoint M of the core, although not particularly limited, may be preferably at least 65, more preferably at least 67, and even more preferably at least 69. The upper limit is also not particularly limited, and may be preferably not more than 78, more preferably not more than 76, and even preferably not more than 74. Hardnesses that deviate from these values may lead to undesirable results similar to those described above for the core surface hardness (Cs).

A hardness (Cm+6) at a position 6 mm outward from the midpoint M of the core, although not particularly limited, may be preferably at least 70, more preferably at least 72, and even more preferably at least 74. The upper limit thereof not particularly limited, and may be preferably not more than 83, more preferably not more than 81, and even more preferably not more than 79. Hardnesses that deviate from these values may lead to undesirable results similar to those described above for the core surface hardness (Cs).

In the core hardness profile, the surface areas A to F defined as follows:

$\frac{1}{2} \times 2 \times (Cm-4-Cm-6)$      surface area A:

$\frac{1}{2} \times 2 \times (Cm-2-Cm-4)$      surface area B:

$\frac{1}{2} \times 2 \times (Cm-Cm-2)$      surface area C:

$\frac{1}{2} \times 2 \times (Cm+2-Cm)$      surface area D:

$\frac{1}{2} \times 2 \times (Cm+4-Cm+2)$      surface area E:

$\frac{1}{2} \times 2 \times (Cm+6-Cm+4)$      surface area F:

are characterized in that a value of (surface area E+surface area F)−(surface area A+surface area B) is preferably at least 1.0, more preferably at least 2.0, and more preferably at least 4.0, and the upper limit is preferably not more than 20.0, more preferably not more than 16.0, and even more preferably not more than 12.0. When this value is too large, the durability to cracking on repeated impact may worsen. On the other hand, when this value becomes too small, the spin rate of the ball on full shots may rise, and the intended distance may not be attainable.

In addition, a value of (surface area D+surface area E)−(surface area B+surface area C) is preferably at least 1.0, more preferably at least 2.0, and even more preferably at least 3.0, and the upper limit is preferably not more than 20.0, more preferably not more than 16.0, and even more preferably not more than 12.0. When this value is too large, the durability to cracking on repeated impact may worsen. On the other hand, when this value becomes too small, the spin rate of the ball on full shots may rise, and the intended distance may not be attainable.

The surface areas A to F preferably satisfy the following conditions:

surface area A<surface area C<(surface area E+surface area F), and surface area B<surface area C<(surface area E+surface area F), and more preferably satisfy the following conditions:
surface area A<surface area C<surface area D<(surface area E+surface area F) and surface area B<surface area C<surface area D<(surface area E+surface area F). If these relationships are not satisfied, the spin rate of the ball on full shots rises, and the intended distance may not be attainable.

Figure 2:
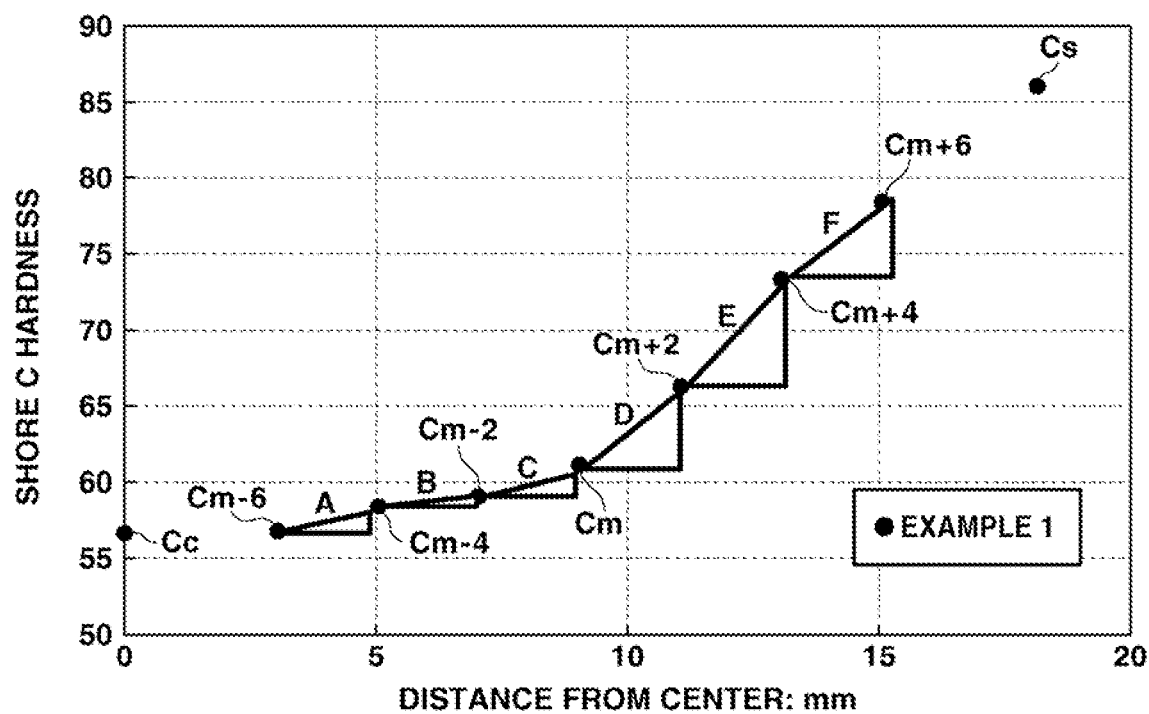
FIG. 2 is a graph that uses inner layer core hardness profile data in Example 1 to describe the surface areas A to F in the inner layer core hardness profile.

FIG. 2 shows a graph describing the surface areas A to F using the inner layer core hardness profile data of Example 1. In this way, the surface areas A to F are surface areas of each triangle whose base is a difference between each specific distance and whose height is a difference in hardness between each position at these specific distances.

An initial velocity of the inner layer core is preferably at least 75.5 m/s, more preferably at least 75.9 m/s, and even more preferably at least 76.2 m/s. The upper limit is preferably not more than 77.2 m/s, more preferably not more than 76.9 m/s, and even more preferably not more than 76.6 m/s. A ball initial velocity that is too high may fall outside the range specified in the Rules of Golf. On the other hand, when the initial velocity becomes too low, the ball rebound on full shots may become low, or the spin rate of the ball rises, and the intended distance may not be attainable. The value of the initial velocity in this case is a numerical value measured by a device for measuring a coefficient of restitution (COR) (Golf Ball Testing Machine) of the same type as the R&A. Specifically, a Golf Ball Testing Machine manufactured by Hye Precision USA is used. As a condition, at the time of measurement, an air pressure is changed in four stages and measured, a relational expression between an incident velocity and the COR is constructed, and the initial velocity at an incident velocity of 43.83 m/s is determined from the relational expression. For a measurement environment of the Golf Ball Testing Machine, an inner layer core (sphere) temperature-controlled for three hours or more in a thermostatic bath adjusted to 23.9±1° C. is used, and measurement is performed at a room temperature of 23.9±2° C. A barrel diameter used is chosen such that a clearance on one side between the barrel diameter and an outer diameter of the object being measured is between 0.2 and 2.0 mm.

Next, the outer layer core is described.

The outer layer core has a material hardness on the Shore C hardness scale, although not particularly limited, is preferably at least 72, more preferably at least 75, and even more preferably at least 78, and the upper limit is preferably not more than 92, more preferably not more than 90, and even more preferably not more than 88. A material hardness on the Shore D hardness scale is preferably at least 47, more preferably at least 49, and even more preferably at least 51, and the upper limit is preferably not more than 62, more preferably not more than 60, and even more preferably not more than 57.

The sphere obtained by encasing the inner layer core with the outer layer core, that is, an entire core, has a surface hardness which, on the Shore C hardness scale, is preferably at least 80, more preferably at least 83, and even more preferably at least 86, and the upper limit is preferably not more than 97, more preferably not more than 95, and even more preferably not more than 93. The surface hardness on the Shore D hardness scale is preferably at least 53, more preferably at least 55, and even more preferably at least 57, and the upper limit is preferably not more than 68, more preferably not more than 66, and even more preferably not more than 63.

If the material hardness of the outer layer core and the surface hardness of the entire core are too soft in comparison with the above ranges, the ball may be too receptive to spin on full shots, or the initial velocity may become low and the distance may not be increased. On the other hand, if the material hardness of the outer layer core and the surface hardness of the entire core are too hard in comparison with the above ranges, the feel at impact may become hard, or the durability to cracking on repeated impact may worsen.

The outer layer core has a thickness that is preferably at least 0.8 mm, more preferably at least 1.0 mm, and even more preferably at least 1.2 mm. On the other hand, the outer layer core thickness has an upper limit that is preferably not more than 2.0 mm, more preferably not more than 1.8 mm, and even more preferably not more than 1.7 mm. If the outer layer core is too thin, the ball spin rate-lowering effect on full shots may be inadequate, and the intended distance may not be attainable. If the outer layer core is too thick, the initial velocity of the entire ball may become low, the actual initial velocity on shots may become too low, and the intended distance may not be attainable.

In addition, in relation to the intermediate layer thickness described later, the outer layer core thickness preferably satisfies the following condition: (intermediate layer thickness)≤(outer layer core thickness), and more preferably satisfies the following condition: (intermediate layer thickness)<(outer layer core thickness).

As a material of the outer layer core, a known rubber material or resin material may be used, although it is preferable to use a resin material from the viewpoint of securing excellent durability on repeated impact. Preferable examples of the resin material may include the following components (a) to (c):

(a) an olefin-unsaturated carboxylic acid binary random copolymer and/or a metal ion neutralized product of an olefin-unsaturated carboxylic acid binary random copolymer;

(b) a base resin obtained by blending an olefin-unsaturated carboxylic acid-unsaturated carboxylic acid ester ternary random copolymer and/or a metal ion neutralized product of an olefin-unsaturated carboxylic acid-unsaturated carboxylic acid ester ternary random copolymer at a weight ratio of 100:0 to 0:100; and (c) a resin composition obtained by blending a non-ionomer thermoplastic elastomer at a weight ratio of 100:0 to 0:100.

As the components (a) to (c), for example, a resin material of an intermediate layer described in JP-A 2010-253268 may be preferably employed.

In the resin material, an optional additive may be appropriately included depending on the intended use. For example, various additives such as a pigment, a dispersant, an antioxidant, an ultraviolet absorber, and a light stabilizer may be included. If these additives are included, the compounding amount thereof is preferably at least 0.1 parts by weight, and more preferably at least 0.5 parts by weight, and the upper limit is preferably not more than 10 parts by weight, and more preferably not more than 4 parts by weight per 100 parts by weight of the total of the base resin.

The resin material may contain an inorganic particulate filler. This inorganic particulate filler, although not particularly limited, is zinc oxide, barium sulfate, titanium dioxide, or the like may be appropriately used. Barium sulfate may be suitably used, and particularly preferably precipitated barium sulfate may be suitably used from the viewpoint of excellent durability to cracking on repeated impact.

A mean particle size of the inorganic particulate filler, although not particularly limited, may be preferably from 0.01 to 100 µm, and more preferably from 0.1 to 10 µm. If the mean particle size of the inorganic particulate filler is too small or too large, dispersibility during material preparation may be deteriorated. The mean particle size means a particle size measured by dispersing the particles in an aqueous solution together with an appropriate dispersant and measuring the particles with a particle size distribution measuring device.

The compounding amount of the inorganic particulate filler, although not particularly limited, is preferably not more than 30 parts by weight per 100 parts by weight of the base resin of the outer layer core material. The specific gravity of the outer layer core is preferably within a range of from 0.95 to 1.25.

The sphere (entire core) obtained by encasing the inner layer core with the outer layer core has an initial velocity that is preferably at least 76.0 m/s, more preferably at least 76.5 m/s, and still more preferably at least 77.0 m/s. The upper limit is preferably not more than 78.0 m/s, more preferably not more than 77.7 m/s, and still more preferably 77.5 m/s. A ball initial velocity that is too high may fall outside the range specified in the Rules of Golf. On the other hand, when the initial velocity becomes too low, the ball rebound on full shots may become low, or the spin rate of the ball rises, and the intended distance may not be attainable. The initial velocity in this case is measured with the same device and under the same conditions as described above for the measurement of the initial velocity of the inner layer core.

Next, the intermediate layer is described.

The intermediate layer has a material hardness on the Shore C hardness scale, although not particularly limited, is preferably at least 90, more preferably at least 92, and even more preferably at least 93, but is preferably not more than 100, more preferably not more than 98, and even more preferably not more than 96. The material hardness on the Shore D hardness scale is preferably at least 64, more preferably at least 66, and even more preferably at least 68, but is preferably not more than 75, more preferably not more than 72, and even more preferably not more than 70.

The sphere obtained by encasing the core with the intermediate layer (intermediate layer-encased sphere) has a surface hardness which, on the Shore C hardness scale, is preferably at least 95, more preferably at least 96, and even more preferably at least 97. The upper limit is preferably not more than 100, more preferably not more than 99, and even more preferably not more than 98. The surface hardness on the Shore D hardness scale is preferably at least 68, more preferably at least 69, and even more preferably at least 70. The upper limit is preferably not more than 78, more preferably not more than 75, and even more preferably not more than 72.

If the material hardness and the surface hardness of the intermediate layer are too soft in comparison with the above ranges, the spin rate of the ball on full shots may rise excessively so that the distance may not be increased, or the initial velocity of the ball may become low so that the distance may not be increased. On the other hand, if the material hardness and the surface hardness of the intermediate layer are too hard in comparison with the above ranges, the durability to cracking on repeated impact may worsen, or the feel at impact on shots with a putter or on short approaches may become too hard.

The intermediate layer has a thickness that is preferably at least 0.7 mm, more preferably at least 0.8 mm, and even more preferably at least 1.0 mm. The intermediate layer thickness has an upper limit that is preferably not more than 1.8 mm, more preferably not more than 1.4 mm, and even more preferably not more than 1.2 mm. It is preferable for the intermediate layer to be thicker than the cover described later. When the intermediate layer thickness falls outside the above range or the intermediate layer is thinner than the cover, the ball spin rate-lowering effect on shots with a driver (W #1) may be inadequate, resulting in a poor distance. Also, if the intermediate layer is too thin, the durability to cracking on repeated impact may worsen.

As a material of the intermediate layer, it is suitable to employ an ionomer resin as a chief material.

The ionomer resin material preferably contains a high-acid ionomer resin having an unsaturated carboxylic acid content (also referred to as "acid content") of at least 16 wt %. The amount of high-acid ionomer resin included per 100 wt % of the resin material is preferably at least 20 wt %, more preferably at least 50 wt %, and even more preferably at least 60 wt %. The upper limit is preferably not more than 100 wt %, more preferably not more than 90 wt %, and even more preferably not more than 85 wt %. When the compounding amount of the high-acid ionomer resin is too small, the spin rate of the ball on full shots may rise, and a good distance may not be attained. On the other hand, when the compounding amount of the high-acid ionomer resin is too high, the durability on repeated impact may worsen.

In addition, if an ionomer resin is employed as the chief material, an aspect that uses in admixture a zinc-neutralized ionomer resin and a sodium-neutralized ionomer resin as the chief materials is desirable. The blending ratio in terms of zinc-neutralized ionomer resin/sodium-neutralized ionomer resin (weight ratio) is from 5/95 to 95/5, preferably from 10/90 to 90/10, and more preferably from 15/85 to 85/15. If the zinc-neutralized ionomer and the sodium-neutralized ionomer are not included in this ratio, the rebound may become too low to obtain a desired flight, the durability to cracking on repeated impact at room temperature may worsen, and the durability to cracking at a low temperature (below zero) may worsen.

In the intermediate layer material, an optional additive may be appropriately included depending on the intended use. For example, various additives such as a pigment, a dispersant, an antioxidant, an ultraviolet absorber, and a light stabilizer may be included. If these additives are included, the compounding amount thereof is preferably at least 0.1 parts by weight, and more preferably at least 0.5 parts by weight, and the upper limit is preferably not more than 10 parts by weight, and more preferably not more than 4 parts by weight per 100 parts by weight of the base resin.

For the intermediate layer material, it is suitable to abrade the surface of the intermediate layer in order to increase the degree of adhesion to a polyurethane preferably used in a cover material described later. Further, it is preferable that a primer (adhesive agent) is applied to the surface of the intermediate layer after the abrasion treatment, or an adhesion reinforcing agent is added to the intermediate layer material.

The material of the intermediate layer may contain an inorganic particulate filler. This inorganic particulate filler, although not particularly limited, is zinc oxide, barium sulfate, titanium dioxide, or the like may be appropriately used. Barium sulfate may be suitably used, and particularly preferably precipitated barium sulfate may be suitably used from the viewpoint of excellent durability to cracking on repeated impact.

A mean particle size of the inorganic particulate filler, although not particularly limited, may be preferably from 0.01 to 100 μm, and more preferably from 0.1 to 10 μm. If the mean particle size of the inorganic particulate filler is too small or too large, dispersibility during material preparation may be deteriorated. The mean particle size means a particle size measured by dispersing the particles in an aqueous solution together with an appropriate dispersant and measuring the particles with a particle size distribution measuring device.

The compounding amount of the inorganic particulate filler is not particularly limited, although the compounding amount is preferably set to at least 0 part by weight, more preferably at least 10 parts by weight, and even more preferably at least 15 parts, per 100 parts by weight of the base resin of the intermediate layer material. Although there is no particular upper limit, the compounding amount is preferably not more than 50 parts by weight, more preferably not more than 40 parts by weight, and even more preferably not more than 30 parts by weight. At an inorganic particulate filler compounding amount that is too low, the durability to cracking on repeated impact may worsen. On the other hand, at an inorganic particulate filler compounding amount that is too high, the ball rebound may decrease or the spin rate of the ball on full shots may rise, as a result of which the intended distance may not be achieved.

A specific gravity of the intermediate layer is preferably at least 1.05, more preferably at least 1.07, and even more preferably at least 1.09, and the upper limit is preferably not more than 1.25, more preferably not more than 1.20, and even more preferably not more than 1.15. If the specific gravity of the intermediate layer is too small, the durability to cracking on repeated impact may worsen. On the other hand, if the specific gravity of the intermediate layer is too large, the ball rebound becomes low, or the spin rate of the ball on full shots rises, and the intended distance may not be attained.

The sphere (intermediate layer-encased sphere) obtained by encasing the core with the intermediate layer has an initial velocity which is preferably at least 77.0 m/s, more preferably at least 77.4 m/s, and even more preferably at least 77.7 m/s. The upper limit is preferably not more than 78.5 m/s, more preferably not more than 78.2 m/s, and even more preferably not more than 77.9 m/s. A ball initial velocity that is too high may fall outside the range specified in the Rules of Golf. On the other hand, when the initial velocity becomes too low, the ball rebound on full shots may become low, or the spin rate of the ball rises, and the intended distance may not be attainable. The initial velocity in this case is the same as the device and conditions used in the measurement of the initial velocity of the inner layer core and the entire core described above.

Next, the cover is described.

The cover has a material hardness on the Shore C hardness scale, although not particularly limited, is preferably at least 50, more preferably at least 57, and even more preferably at least 63, but is preferably not more than 80, more preferably not more than 74 and even more preferably not more than 70. The material hardness on the Shore D hardness scale is preferably at least 30, more preferably at least 35, and even more preferably at least 40, but is preferably not more than 53, more preferably not more than 50 and even more preferably not more than 47.

The sphere obtained by encasing the intermediate layer-encased sphere with the cover—that is, the ball—has a surface hardness which, on the Shore C hardness scale, is preferably at least 73, more preferably at least 78, and even more preferably at least 83, but is preferably not more than 95, more preferably not more than 92, and even more preferably not more than 90. The surface hardness on the Shore D hardness scale is preferably at least 50, more preferably at least 53, and even more preferably at least 56, but is preferably not more than 70, more preferably not more than 65, and even more preferably not more than 60.

If the material hardness and the surface hardness of the cover are too soft in comparison with the above ranges, the spin rate of the ball on full shots may rise excessively, and the distance may not be increased. On the other hand, if the material hardness and the surface hardness of the cover are too hard in comparison with the above ranges, the ball may not be fully receptive to spin on approach shots, or a scuff resistance may worsen.

The cover has a thickness of preferably at least 0.3 mm, more preferably at least 0.45 mm, and even more preferably at least 0.6 mm. The upper limit in the cover thickness is preferably not more than 1.2 mm, more preferably not more than 0.9 mm, and even more preferably not more than 0.8 mm. When the cover is too thick, the rebound of the ball on full shots is inadequate or the spin rate of the ball may rise, as a result of which a good distance may not be achieved. On the other hand, when the cover is too thin, the scuff resistance may worsen or the ball may not be receptive to spin on approach shots and may lack sufficient controllability.

As a cover material, various types of thermoplastic resin used as a cover material in golf balls may be used, but it is suitable to use a resin material composed primarily of a thermoplastic polyurethane from the viewpoints of spin controllability in the short game and scuff resistance. That is, the cover is preferably formed of a resin blend containing (I) a thermoplastic polyurethane and (II) a polyisocyanate compound as principal components.

The total weight of the components (I) and (II) is recommended to be at least 60%, and more preferably at least 70% with respect to the total amount of the resin composition of the cover. The components (I) and (II) are described in detail below.

Describing the thermoplastic polyurethane (I), the construction of the thermoplastic polyurethane includes a soft segment composed of a polymeric polyol (polymeric glycol), which is a long-chain polyol, and a hard segment composed of a chain extender and a polyisocyanate compound. Here, as the long-chain polyol serving as a starting material, any of those hitherto used in the art related to thermoplastic polyurethane may be used, and are not particularly limited, and examples thereof may include polyester polyol, polyether polyol, polycarbonate polyol, polyester polycarbonate polyol, polyolefin polyol, conjugated diene polymer-based polyol, castor oil-based polyol, silicone-based polyol, and vinyl polymer-based polyol. These long-chain polyols may be used singly, or two or more may be used in combination. Among them, a polyether polyol is preferable from the viewpoint that a thermoplastic polyurethane having a high rebound resilience and excellent low-temperature properties can be synthesized.

As the chain extender, those hitherto used in the art related to thermoplastic polyurethanes may be suitably used, and for example, a low-molecular-weight compound having on the molecule two or more active hydrogen atoms capable of reacting with an isocyanate group and having a molecular weight of not more than 400 is preferable. Examples of the chain extender include, but are not limited to, 1,4-butylene glycol, 1,2-ethylene glycol, 1,3-butanediol, 1,6-hexanediol, 2,2-dimethyl-1,3-propanediol, or the like. Among them, the chain extender is preferably an aliphatic diol having from 2 to 12 carbon atoms, and is more preferably 1,4-butylene glycol.

As the polyisocyanate compound, those hitherto used in the art related to thermoplastic polyurethane may be suitably used, and are not particularly limited. Specifically, one or more selected from the group consisting of 4,4'-diphenylmethane diisocyanate, 2,4-toluene diisocyanate (or) 2,6-toluene diisocyanate, p-phenylene diisocyanate, xylylene diisocyanate, 1,5-naphthylene diisocyanate, tetramethylxylylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, and dimer acid diisocyanate may be used. However, it may be difficult to control a crosslinking reaction during injection molding depending on the type of isocyanate. In the present invention, 4,4'-diphenylmethane diisocyanate, which is an aromatic diisocyanate, is most preferable from the viewpoint of providing a balance between stability during production and the physical properties to be manifested.

As specific examples of the thermoplastic polyurethane serving as the component (I), commercially available products may be used such as Pandex T-8295, Pandex T-8290, and Pandex T-8260 (all manufactured by DIC Covestro Polymer, Ltd.).

Although not an essential component, a thermoplastic elastomer other than the thermoplastic polyurethane may be included as a separate component (III) with the components (I) and (II). By including the component (III) in the resin blend, a flowability of the resin blend may be further improved, and various physical properties required of the golf ball cover material may be increased, such as rebound and scuff resistance.

A compositional ratio of the components (I), (II), and (III), although not particularly limited, is that, in order to sufficiently and effectively exhibit the advantageous effects of the present invention, the compositional ratio (I):(II):(III) is preferably in the weight ratio range of from 100:2:50 to 100:50:0, and more preferably from 100:2:50 to 100:30:8.

Furthermore, various additives other than the components constituting the thermoplastic polyurethane may be included in the resin blend as necessary, and for example, a pigment, a dispersant, an antioxidant, a light stabilizer, an ultraviolet absorber, an internal mold lubricant, or the like may be appropriately included.

The cover has a specific gravity, although not particularly limited, is preferably at least 1.00, more preferably at least 1.03, and even more preferably at least 1.06. The upper limit is preferably not more than 1.20, more preferably not more than 1.17, and even more preferably not more than 1.14. When the cover specific gravity is lower than the above range, the ratio of low specific gravity materials such as ionomer blended into the cover made chiefly of urethane ends up becoming high, as a result of which the scuff resistance may worsen. On the other hand, when the cover specific gravity is too high, the amount of filler added is high and the rebound may become too low, as a result of which the intended distance may be unattainable.

The manufacture of a multi-piece solid golf ball in which the inner layer core, the outer layer core, the intermediate layer, and the cover (outermost layer) described above are formed as successive layers can be performed by a customary method such as a known injection molding process. For example, each resin material of the outer layer core and the intermediate layer is sequentially injected with each injection mold around the inner layer core that is a core ball to obtain each encased sphere, and finally, the resin material of the cover that is the outermost layer is injection molded, to obtain a multi-piece golf ball. In addition, as each of the encased layers, it is also possible to produce a golf ball by preparing two half-cups pre-molded into hemispherical shapes in advance, enclosing an encased sphere within the two half-cups, and molding the encased sphere under applied heat and pressure.

The golf ball has a deflection (mm) when compressed under a final load of 1,275 N (130 kgf) from an initial load of 98 N (10 kgf) which is preferably at least 2.0 mm, more preferably at least 2.3 mm, and even more preferably at least 2.5 mm. The deflection upper limit is preferably not more than 3.0 mm, more preferably not more than 2.9 mm, and even more preferably not more than 2.8 mm. When the deflection of the golf ball is too small, i.e., when the golf ball is too hard, the spin rate of the ball may rise excessively, resulting in a poor flight in particular in a range where the head speed is low, and the feel at impact may become too hard. On the other hand, when the deflection is too large, i.e., when the sphere is too soft, the ball rebound may become too low, resulting in a poor flight in particular at a head speed of at least 45 m/s, the feel at impact may be too soft, or the durability to cracking on repeated impact may worsen.

The sphere (ball) obtained by encasing the intermediate layer-encased sphere with the cover has an initial velocity that is preferably at least 76.8 m/s, more preferably at least 77.0 m/s, and even more preferably at least 77.2 m/s. The upper limit is preferably not more than 77.724 m/s. A ball initial velocity that is too high may fall outside the range specified in the Rules of Golf. On the other hand, when the ball initial velocity is too low, the ball may not travel well on full shots. The initial velocity in this case is measured with the same device and under the same conditions as described above for the measurement of the initial velocities of the core and the intermediate layer-encased sphere.

Relationships Between Surface Hardnesses of Each Sphere

Expressed on the Shore C hardness scale, a value obtained by subtracting the center hardness of the inner layer core from the surface hardness of the entire core is preferably at least 24, more preferably at least 27, and even more preferably at least 30, and the upper limit is preferably not more than 42, more preferably not more than 39, and even more preferably not more than 36. When the above value is too small, the spin rate of the ball may rise on full shots, and the intended distance may not be attained. On the other hand, when the above value is too large, the durability to cracking on repeated impact worsens, or the actual initial velocity on shots becomes lower, and the intended distance may not be attainable.

Expressed on the Shore C hardness scale, a value obtained by subtracting the surface hardness of the inner layer core from the surface hardness of the entire core is preferably at least 0, more preferably at least 4, and even more preferably at least 8, and the upper limit is preferably not more than 25, more preferably not more than 20, and even more preferably not more than 18. If there is a deviation from the above ranges, the spin rate of the ball on full shots rises, and the intended distance may not be attainable.

Expressed on the Shore C hardness scale, a value obtained by subtracting the center hardness of the inner layer core from the surface hardness of the intermediate layer-encased sphere is preferably at least 35, more preferably at least 38, and even more preferably at least 40, and the upper limit is preferably not more than 52, more preferably not more than 48, and even more preferably not more than 45. When the above value is too small, the spin rate of the ball may rise on full shots, and the intended distance may not be attained. On the other hand, when the above value is too large, the durability to cracking on repeated impact worsens, or the actual initial velocity on shots becomes lower, or the spin rate of the ball on full shots rises, and the intended distance may not be attainable.

Expressed on the Shore C hardness scale, a value obtained by subtracting the surface hardness of the entire core from the surface hardness of the intermediate layer-encased sphere is preferably at least 1, more preferably at least 3, and even more preferably at least 5, and the upper limit is preferably not more than 25, more preferably not more than 17, and even more preferably not more than 14. If there is a deviation from the above ranges, the spin rate of the ball on full shots rises, and the intended distance may not be attainable.

Expressed on the Shore C hardness scale, a value obtained by subtracting the surface hardness of the ball from the surface hardness of the intermediate layer-encased sphere is preferably at least 2, more preferably at least 4, and even more preferably at least 6, and the upper limit is preferably not more than 25, more preferably not more than 17, and even more preferably not more than 14. When the above value is too small, controllability in the short game may worsen. On the other hand, when the above value is too large, the spin rate of the ball on full shots may rise, and the intended distance may not be attainable.

Initial Velocity Relationships of Each Sphere

It is critical for the relationship between the initial velocity of the inner layer core, the initial velocity of the entire core, the initial velocity of the sphere (intermediate layer-encased sphere) obtained by encasing the core with the intermediate layer, and the initial velocity of the sphere (ball) obtained by encasing the intermediate layer-encased sphere with the cover to satisfy the following three conditions:

(initial velocity of ball)<(initial velocity of intermediate layer-encased sphere), (initial velocity of intermediate layer-encased sphere)−(initial velocity of entire core)≤0.70 (m/s), and (initial velocity of entire core)−(initial velocity of inner layer core)≥0.20 (m/s).

By optimizing the initial velocity relationship of these layers, it is possible to obtain a desired distance by suppressing the spin rate of the ball on full shots, and the durability to cracking on repeated impact can be improved.

The value obtained by subtracting the initial velocity of the ball from the initial velocity of the intermediate layer-encased sphere is more than 0 m/s, preferably at least 0.1 m/s, and more preferably at least 0.3 m/s. The upper limit is preferably not more than 1.0 m/s, more preferably not more than 0.7 m/s, and even more preferably not more than 0.5 m/s. When this value is too large, the spin rate of the ball rises on full shots, the actual initial velocity on shots becomes low, and the intended distance may not be attainable. On the other hand, when this value is too small due to the cover, the cover becomes hard and the ball is not receptive to spin in the short game, or the durability on repeated impact may be inferior. In addition, when this value is small due to the intermediate layer, the spin rate of the ball rises on full shots, and the intended distance may not be attainable.

A value obtained by subtracting the initial velocity of the entire core from the initial velocity of the intermediate layer-encased sphere is preferably at least 0.10 m/s, more preferably at least 0.20 m/s, and still more preferably at least 0.30 m/s. The upper limit is 0.70 m/s, preferably not more than 0.60 m/s, and more preferably not more than 0.57 m/s. When this value is too large due to the intermediate layer, the durability to cracking on repeated impact may worsen, and when this value is too large due to the outer layer core, the spin rate of the ball may rise on full shots, and the intended distance may not be attainable. When this value is too small due to the intermediate layer, the spin rate of the ball on full shots may rise, and the intended distance may not be attainable, and when this value is too small due to the outer layer core, the feel at impact may worsen, or the durability to cracking on repeated impact may worsen.

The value obtained by subtracting the initial velocity of the inner layer core from the initial velocity of the entire core is preferably at least 0.20 m/s, more preferably at least 0.65 m/s, and even more preferably at least 0.80 m/s, and the upper limit is preferably not more than 1.05 m/s, more preferably not more than 1.00 m/s, and even more preferably not more than 0.95 m/s. When this value is too large, the durability to cracking on repeated impact may worsen. On the other hand, when this value is too small, the spin rate of the ball rises on full shots, and the intended distance may not be attainable.

The value obtained by subtracting the initial velocity of the inner layer core from the initial velocity of the intermediate layer-encased sphere is preferably at least 1.00 m/s, more preferably at least 1.15 m/s, and even more preferably at least 1.30 m/s, and the upper limit is preferably not more than 1.60 m/s, more preferably not more than 1.55 m/s, and even more preferably not more than 1.50 m/s. When this value is too large, the durability to cracking on repeated impact may worsen. On the other hand, when this value is too small, the spin rate of the ball rises on full shots, and the intended distance may not be attainable.

Specific Gravity Relationship Between Intermediate Layer and Cover

It is recommended that a difference in the specific gravity of each layer between the specific gravity of the intermediate layer and the specific gravity of the cover is typically within ±0.15, preferably within ±0.10, and more preferably within ±0.05. That is, a value of (specific gravity of cover)–(specific gravity of intermediate layer material) is typically at least –0.15, preferably at least –0.10, and more preferably at least –0.05, and the upper limit is typically not more than 0.15, preferably not more than 0.10, and more preferably not more than 0.05. When the difference in specific gravity between these layers is too large, in a case where the intermediate layer material and/or the cover material cannot be molded on a completely concentric circle with these layers and with the layers located inside these layers and is eccentric, the ball when with a putter may greatly wobble to the left or right.

Inner Layer Core Diameter and Ball Diameter

A relationship between the inner layer core diameter and the ball diameter, that is, a value of (inner layer core diameter)/(ball diameter) is preferably at least 0.820, more preferably at least 0.824, and even more preferably at least 0.828. The upper limit is preferably not more than 0.970, more preferably not more than 0.920, and even more preferably not more than 0.900. When this value is too small, the initial velocity of the ball becomes low, or the deflection of the entire ball becomes small and the ball becomes hard, the spin rate of the ball on full shots rises, and the intended distance may not be attainable. On the other hand, when the above value is too large, the spin rate of the ball on full shots rises, and the intended distance may not be attainable, or the durability to cracking on repeated impact may worsen.

Numerous dimples may be formed on the outside surface of the cover. The number of dimples arranged on the surface of the cover, although not particularly limited, is preferably at least 250, more preferably at least 300, and even more preferably at least 320, and the upper limit is preferably not more than 380, more preferably not more than 350, and even more preferably not more than 340. When the number of dimples is larger than the above range, a ball trajectory may become lower, and a distance traveled by the ball may decrease. On the other hand, when the number of dimples decreases, the ball trajectory may become higher, and the distance traveled by the ball may not increase.

As for the shape of the dimples, one type or a combination of two or more types such as a circular shape, various polygonal shapes, a dewdrop shape, and other oval shapes may be appropriately used. For example, when circular dimples are used, the diameter may be about 2.5 mm or more and 6.5 mm or less, and the depth may be at least 0.08 mm and not more than 0.30 mm.

A dimple coverage ratio of the dimples on the spherical surface of the golf ball, specifically, a ratio (SR value) of a sum of the individual dimple surface areas, each defined by a flat plane circumscribed by an edge of a dimple, to a ball spherical surface area and on the assumption that the ball has no dimples, is desirably at least 70% and not more than 90% from the viewpoint of sufficiently exhibiting aerodynamic properties. In addition, a value $V_0$ obtained by dividing the spatial volume of the dimples below the flat plane circumscribed by the edge of each dimple by a volume of a cylinder whose base is the flat plane and whose height is a maximum depth of the dimple from the base is preferably at least 0.35 and not more than 0.80 from the viewpoint of optimizing the ball trajectory. Furthermore, a VR value of a sum of the volumes of the individual dimples, formed below the flat plane circumscribed by the edge of a dimple, to a ball spherical volume and on the assumption that the ball has no dimples is preferably at least 0.6% and not more than 1.0%. If there is a deviation from the ranges of each numerical value described above, the resulting trajectory may not enable a good distance to be attained, and the ball may fail to travel a sufficiently satisfactory distance.

The multi-piece solid golf ball of the invention can be made to conform to the Rules of Golf for play. The inventive ball may be formed to a diameter which is such that the ball does not pass through a ring having an inner diameter of 42.672 mm and to a weight which is preferably between 45.0 and 45.93 g.

EXAMPLES

Hereinafter, the present invention is specifically described with reference to Examples and Comparative Examples, although the present invention is not limited to the following Examples.

Examples 1 to 3 and Comparative Examples 1 to 9

Formation of Core

In Examples 1 to 3, Comparative Examples 1 to 3, and Comparative Example 8, a rubber composition of each Example shown in Table 1 is prepared, and then vulcanization molding is performed under vulcanization conditions according to each Example shown in Table 1 to produce an inner layer core.

In Comparative Examples 4 to 7 and Comparative Example 9, inner layer cores were produced based on the formulations in Table 1 in the same manner as described above.

TABLE 1

|  |  | Example | | | Comparative Example | | | | | | | | |
|---|---|---|---|---|---|---|---|---|---|---|---|---|---|
|  |  | 1 | 2 | 3 | 1 | 2 | 3 | 4 | 5 | 6 | 7 | 8 | 9 |
| Inner layer core formulation (pbw) | Polybutadiene | 100 | 100 | 100 | 100 | 100 | 100 | 100 | 100 | 100 | 100 | 100 | 100 |
|  | Zinc acrylate | 37.8 | 36.5 | 35.2 | 33.7 | 32.7 | 37.5 | 33.7 | 31.7 | 29.7 | 31.7 | 35.0 | 38.5 |
|  | Organic peroxide | 0.6 | 0.6 | 0.6 | 0.6 | 0.6 | 0.6 | 0.6 | 0.6 | 0.6 | 0.6 | 1.0 | 0.6 |
|  | Water | 0.8 | 0.8 | 0.8 | 0.8 | 0.8 | 0.8 | 0.8 | 0.8 | 0.8 | 0.8 | 0.8 | 0.8 |
|  | Antioxidant | 0.1 | 0.1 | 0.1 | 0.1 | 0.1 | 0.1 | 0.1 | 0.1 | 0.1 | 0.1 | 0.1 | 0.1 |
|  | Zinc oxide | 17.5 | 18.1 | 18.6 | 19.2 | 19.6 | 23.9 | 25.3 | 26.1 | 26.9 | 20.0 | 25.6 | 9.9 |
|  | Zinc salt of pentachlorothiophenol | 0.7 | 0.7 | 0.7 | 0.7 | 0.7 | 0.7 | 0.7 | 0.7 | 0.7 | 0.7 | 1.0 | 1.0 |
| Vulcanization conditions | Temperature (° C.) | 152 | 152 | 152 | 152 | 152 | 152 | 152 | 152 | 152 | 152 | 158 | 158 |
|  | Time (min) | 19 | 19 | 19 | 19 | 19 | 19 | 19 | 19 | 19 | 19 | 13 | 13 |

Details of the above formulations are as follows.
Polybutadiene: Trade name "BR730" (manufactured by JSR Corporation)
Zinc acrylate: Trade name "ZN-DA85S" (manufactured by Nippon Shokubai Co., Ltd.)
Organic peroxide: Dicumyl peroxide, trade name "Percumyl D" (manufactured by NOF Corporation)
Water: Pure water (manufactured by Seiki Co., Ltd.)
Antioxidant: 2,2-methylenebis(4-methyl-6-butylphenol), trade name "Nocrac NS-6" (manufactured by Ouchi Shinko Chemical Industrial Co., Ltd.)
Zinc oxide: Trade name "Grade 3 Zinc Oxide" (manufactured by Sakai Chemical Industry Co., Ltd.)
Zinc salt of pentachlorothiophenol: Manufactured by Wako Pure Chemical Industries, Ltd.

Formation of Outer Layer Core, Intermediate Layer, and Cover (Outermost Layer)

Next, in Examples 1 to 3, Comparative Examples 1 to 3, and Comparative Example 8, a two-layer core (entire core) is produced by injection molding the resin material No. 1 or No. 2 of the outer layer core shown in Table 2 around the inner layer core surface using an injection mold. Next, using a separate injection mold, injection molding is performed with the resin materials No. 3 to No. 5 of the intermediate layer shown in Table 2 around the entire core to produce the intermediate layer-encased sphere. Next, using a separate injection mold, injection molding is performed with the resin material No. 6 or No. 7 of the cover (outermost layer) shown in Table 2 around the intermediate layer-encased sphere to produce a cover-encased sphere (that is, the entire ball). At this time, a predetermined large number of dimples common to all Examples and Comparative Examples are formed on the surface of the cover.

In Comparative Examples 4 to 7, a two-layer core (entire core) was produced by injection molding the resin material No. 1 of the outer layer core shown in Table 2 around the inner layer core surface using an injection mold. In Comparative Example 9, the outer layer core is not formed, and the inner layer core corresponds to the entire core. Next, in Comparative Examples 4 to 7 and Comparative Example 9, injection molding was performed with the resin material No. 3 or No. 4 of the intermediate layer shown in Table 2 around the entire core to produce the intermediate layer-encased sphere using a separate injection mold. Next, using a separate injection mold, injection molding was performed with the resin material No. 6 of the cover (outermost layer) shown in Table 2 around the intermediate layer-encased sphere to produce the cover-encased sphere (that is, the entire ball). At this time, a predetermined large number of dimples common to all Examples and Comparative Examples were formed on the surface of the cover.

TABLE 2

| Resin composition (pbw) | Acid content (wt %) | Metal type | No. 1 | No. 2 | No. 3 | No. 4 | No. 5 | No. 6 | No. 7 |
|---|---|---|---|---|---|---|---|---|---|
| HPF1000 | 12 | Mg | 100 |  |  |  |  |  |  |
| Himilan 1605 | 15 | Na |  |  |  |  | 44 |  |  |
| Himilan 1557 | 12 | Zn |  | 15 |  |  |  |  |  |
| Himilan 1706 | 15 | Zn |  |  | 15 |  |  |  |  |
| AM7318 | 18 | Na |  | 85 | 85 |  |  |  | 75 |
| AM7327 | 7 | Zn |  |  |  |  |  |  | 25 |
| AN4319 |  |  |  |  |  | 42 |  |  |  |
| AN4221C |  |  |  |  |  | 14 |  |  |  |
| Magnesium oxide |  |  |  |  |  | 0.9 |  |  |  |
| Magnesium stearate |  |  |  |  |  | 34 |  |  |  |
| Titanium oxide |  |  |  |  |  |  |  | 3 | 4 |
| Barium sulfate |  |  |  | 20 |  |  |  |  |  |
| Trimethylolpropane |  |  |  | 1.1 | 1.1 |  |  |  |  |
| Hytrel ® 4001 |  |  |  |  |  | 100 |  |  |  |
| TPU |  |  |  |  |  |  |  |  | 100 |

Details of the blending components in the above table are as follows.

Trade names of the chief materials mentioned in the table are as follows.

"DOW™ HPF 1000 Resin" manufactured by Dow Inc.
"Himilan 1605", "Himilan 1557", "Himilan 1706", "AM7318", and "AM7327" ionomer resins manufactured by Dow-Mitsui Polychemicals Co., Ltd.
"Nucrel AN4319" and "Nucrel AN4221C" manufactured by Dow-Mitsui Polychemicals Co., Ltd.
"Precipitated Barium Sulfate 300" barium sulfate manufactured by Sakai Chemical Industry Co., Ltd.

"Trimethylolpropane" (TMP) manufactured by Tokyo Chemical Industry Co., Ltd.

"Hytrel® 4001" polyester elastomer manufactured by DuPont Toray Specialty Materials K.K.

"Pandex" ether-type thermoplastic polyurethane (TPU), material hardness (Shore D) 46, manufactured by DIC Covestro Polymer Ltd.

For each resulting golf ball, various physical properties such as internal hardnesses at various positions of the inner layer core, outer diameters of each encased sphere, thicknesses and material hardnesses of each layer, surface hardnesses of each encased sphere, and initial velocities of each encased sphere are evaluated by the following methods, and are shown in Tables 3 and 4.

Hardness Profile of Inner Layer Core

The inner layer core surface is spherical, but an indenter of a durometer is set substantially perpendicular to the spherical core surface, and a core surface hardness expressed on the Shore C hardness scale is measured in accordance with ASTM D2240. With respect to the inner layer core center and a predetermined position of the inner layer core, the inner layer core is cut into hemispheres to obtain a flat cross-section, the hardness is measured by perpendicularly pressing the indenter of the durometer against the center portion and the predetermined positions shown in Table 3, and the hardnesses at the center and each position are shown as Shore C hardness values. For the measurement of the hardness, a P2 Automatic Rubber Hardness Tester manufactured by Kobunshi Keiki Co., Ltd. equipped with a Shore C durometer is used. For the hardness value, a maximum value is read. All measurements are performed in an environment of 23±2° C. The numerical values in the table are Shore C hardness values.

In addition, in the inner layer core hardness profile, letting Cc be the Shore C hardness at the inner layer core center, $C_m$ be the Shore C hardness at the midpoint M between the inner layer core center and the inner layer core surface, Cm−2, Cm−4, and Cm−6 be respective Shore C hardnesses at positions 2 mm, 4 mm, and 6 mm inward from the midpoint M, Cm+2, Cm+4, and Cm+6 be respective Shore C hardnesses at positions 2 mm, 4 mm, and 6 mm outward from the midpoint M, and Cs be the Shore C hardness at the inner layer core surface, the surface areas A to F are calculated as follows:

½×2×(Cm−4−Cm−6)  surface area A:

½×2×(Cm−2−Cm−4)  surface area B:

½×2×(Cm−Cm−2)  surface area C:

½×2×(Cm+2−Cm)  surface area D:

½×2×(Cm+4−Cm+2)  surface area E:

½×2×(Cm+6−Cm+4)  surface area F:

and the values of the following six expressions are determined:

(1) surface areas: A+B
(2) surface areas: B+C
(3) surface areas: D+E
(4) surface areas: E+F
(5) (surface areas: E+F)−(surface areas: A+B)
(6) (surface areas: D+E)−(surface areas: B+C)

Figure 3:
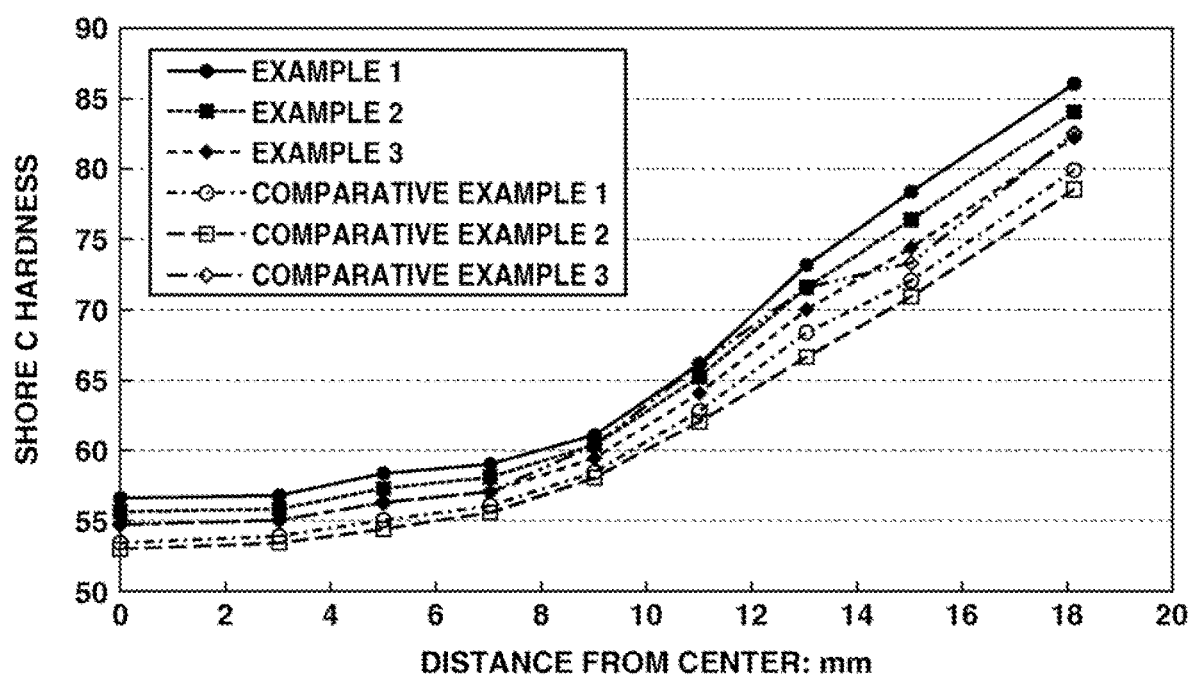
FIG. 3 is a graph showing the inner layer core hardness profiles of Examples 1 to 3 and Comparative Examples 1 to 3.
Figure 4:
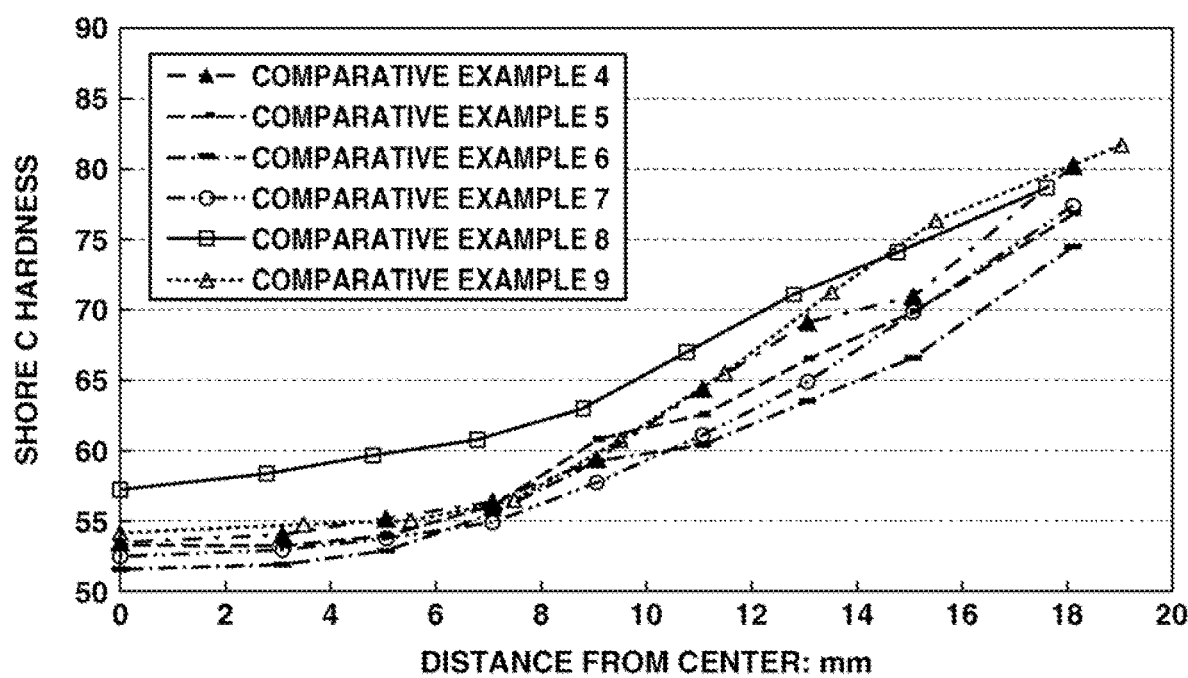
FIG. 4 is a graph showing the inner layer core hardness profiles in Comparative Examples 4 to 9.

The surface areas A to F in the inner layer core hardness profile are described in FIG. 2, which shows a graph that illustrates the surface areas A to F using the hardness profile data from Example 1. In addition, FIGS. 3 and 4 show graphs of core hardness profiles for Examples 1 to 3 and Comparative Examples 1 to 9.

Diameters of Inner Layer Core, Entire Core, and Intermediate Layer-Encased Sphere At a temperature adjusted to 23.9±1° C. for at least three hours or more in a thermostatic bath, five random places on the surface are measured in a room with a temperature of 23.9±2° C., and, using an average value of these measurements as a measured value of each sphere, an average value for the diameter of 10 such spheres is determined.

Ball Diameter

At a temperature adjusted to 23.9±1° C. for at least three hours or more in a thermostatic bath, a diameter at 15 random dimple-free places is measured in a room at a temperature of 23.9±2° C., and, using an average value of these measurements as a measured value of one ball, an average value for the diameter of 10 balls is determined.

Deflections of Inner Layer Core, Entire Core, Intermediate Layer-Encased Sphere, and Ball The inner layer core and each subject encased sphere are placed on a hard plate, and a deflection when compressed under a final load of 1,275 N (130 kgf) from an initial load of 98 N (10 kgf) is measured. The deflection in each case is a measurement value measured in a room at a temperature of 23.9±2° C. after temperature adjustment to 23.9±1° C. for at least three hours or more in a thermostatic bath. A pressing speed of a head that compresses the inner layer core and each subject encased sphere is set to 10 mm/s.

Material Hardnesses (Shore C and Shore D Hardnesses) of Outer Layer Core, Intermediate Layer, and Cover The resin material of each layer is molded into a sheet having a thickness of 2 mm and left at a temperature of 23±2° C. for two weeks. At the time of measurement, three such sheets are stacked together. The Shore C hardness and the Shore D hardness are each measured with a Shore C durometer and a Shore D durometer conforming to the ASTM D2240 standard. For the measurement of the hardness, the P2 Automatic Rubber Hardness Tester manufactured by Kobunshi Keiki Co., Ltd. to which a Shore C durometer or a Shore D durometer is mounted is used. For the hardness value, a maximum value is read.

Surface Hardnesses of Outer Layer Core, Intermediate Layer-Encased Sphere, and Ball A measurement is performed by perpendicularly pressing the indenter against the surface of each sphere. The surface hardness of the ball (cover) is a measured value at a dimple-free area (land) on the surface of the ball. The Shore C hardness and the Shore D hardness are each measured with a Shore C durometer and a Shore D durometer conforming to the ASTM D2240 standard. For the measurement of the hardness, the P2 Automatic Rubber Hardness Tester manufactured by Kobunshi Keiki Co., Ltd. to which a Shore C durometer or a Shore D durometer is mounted is used. For the hardness value, a maximum value is read.

Initial Velocity of Each Sphere

The measurement principle for measuring an initial velocity of each sphere using the device for measuring COR manufactured by Hye Precision Products of the same type as the R&A is shown below. An air pressure is changed to four stages of 35.5 psi, 36.5 psi, 39.5 psi, and 40.5 psi, and a ball is fired at four stages of incident velocity by respective air pressures, collided with a barrier, and its COR is measured. That is, a correlation equation between the incident velocity and the COR is created by changing the air pressure in four stages. Similarly, a correlation equation between the incident velocity and a contact time is created.

Then, from these correlation equations, the COR (coefficient of restitution) and the contact time (μs) at an incident velocity of 43.83 m/s are determined and substituted into the following initial velocity conversion equation to calculate an initial velocity of each sphere.

$$IV = 136.8 + 136.3e + 0.019tc \quad (5)$$

[Here, e is a coefficient of restitution, and tc is a contact time (μs) at a collision speed of 143.8 ft/s (43.83 m/s).]

In the measurement of the initial velocity of each sphere, the barrel inner diameters to be used are as follows.

Inner layer core: Barrel inner diameter of Examples 1 to 3 and Comparative Examples 1 to 7: 38.23 mm; barrel inner diameter of Comparative Example 8: 36.58 mm; barrel inner diameter of Comparative Example 9: 39.88 mm Outer layer core: Barrel inner diameter of Examples 1 to 3 and Comparative Examples 1 to 7: 39.88 mm; barrel inner diameter of Comparative Example 8: 38.23 mm Intermediate layer-encased sphere: Barrel inner diameter of Examples 1 to 3 and Comparative Examples 1 to 9: 41.53 mm Ball: Barrel inner diameter of Examples 1 to 3 and Comparative Examples 1 to 9: 43.18 mm

TABLE 3

| | | Example | | | Comparative Example | | | | | | | | |
|---|---|---|---|---|---|---|---|---|---|---|---|---|---|
| | | 1 | 2 | 3 | 1 | 2 | 3 | 4 | 5 | 6 | 7 | 8 | 9 |
| Construction (piece) | | 4P | 4P | 4P | 4P | 4P | 4P | 4P | 4P | 4P | 4P | 4P | 3P |
| Inner layer core | Outer diameter (mm) | 36.27 | 36.27 | 36.27 | 36.29 | 36.28 | 36.27 | 36.26 | 36.27 | 36.27 | 36.27 | 35.2 | 38.06 |
| | Weight (g) | 29.3 | 29.3 | 29.3 | 29.3 | 29.3 | 30.2 | 30.2 | 30.2 | 30.2 | 29.3 | 27.8 | 32.6 |
| | Specific gravity | 1.17 | 1.17 | 1.17 | 1.17 | 1.17 | 1.21 | 1.21 | 1.21 | 1.21 | 1.17 | 1.22 | 1.13 |
| | Deflection (mm) | 3.7 | 4.0 | 4.2 | 4.5 | 4.7 | 4.1 | 4.4 | 4.7 | 5.1 | 4.8 | 4.6 | 4.0 |
| | Initial velocity (m/s) | 76.48 | 76.43 | 76.38 | 76.33 | 76.27 | 76.21 | 76.17 | 75.99 | 75.99 | 76.22 | 76.19 | 76.85 |
| Inner layer core hardness profile | Cs (Shore C) | 86.0 | 84.1 | 82.2 | 79.8 | 78.6 | 82.6 | 80.4 | 76.9 | 74.4 | 77.4 | 78.8 | 81.8 |
| | Cm + 6 (Shore C) | 78.4 | 76.4 | 74.5 | 72.1 | 71.0 | 73.4 | 71.0 | 69.9 | 66.5 | 69.8 | 74.1 | 76.4 |
| | Cm + 4 (Shore C) | 73.3 | 71.6 | 69.9 | 68.4 | 66.7 | 71.7 | 69.3 | 66.5 | 63.5 | 64.9 | 71.1 | 71.3 |
| | Cm + 2 (Shore C) | 66.2 | 65.2 | 64.1 | 62.9 | 62.0 | 66.2 | 64.4 | 62.5 | 60.3 | 61.1 | 66.9 | 65.6 |
| | Cm (Shore C) | 61.1 | 60.3 | 59.5 | 58.4 | 58.1 | 60.3 | 59.5 | 60.8 | 59.1 | 57.7 | 63.0 | 60.7 |
| | Cm − 2 (Shore C) | 59.0 | 58.1 | 57.2 | 56.1 | 55.5 | 56.9 | 56.4 | 56.0 | 55.3 | 54.8 | 60.7 | 56.5 |
| | Cm − 4 (Shore C) | 58.4 | 57.3 | 56.3 | 55.1 | 54.4 | 56.3 | 55.3 | 54.0 | 52.8 | 53.7 | 59.6 | 55.1 |
| | Cm − 6 (Shore C) | 56.8 | 55.9 | 55.0 | 53.9 | 53.5 | 55.0 | 54.1 | 53.2 | 51.9 | 53.0 | 58.4 | 54.7 |
| | Cc (Shore C) | 56.6 | 55.6 | 54.7 | 53.5 | 53.0 | 54.7 | 53.6 | 53.3 | 51.6 | 52.5 | 57.2 | 54.3 |
| | Cs − Cc (Shore C) | 29.4 | 28.5 | 27.5 | 26.3 | 25.6 | 27.9 | 26.8 | 23.6 | 22.8 | 24.9 | 21.6 | 27.5 |
| | (Cs − Cc)/(Cm − Cc) | 6.5 | 6.1 | 5.7 | 5.4 | 5.0 | 5.0 | 4.5 | 3.1 | 3.0 | 4.8 | 3.7 | 4.3 |
| | Surface area A | 1.6 | 1.4 | 1.3 | 1.2 | 0.9 | 1.3 | 1.2 | 0.8 | 0.9 | 0.7 | 1.2 | 0.4 |
| | Surface area B | 0.6 | 0.8 | 0.9 | 1.0 | 1.1 | 0.6 | 1.1 | 2.0 | 2.5 | 1.1 | 1.1 | 1.4 |
| | Surface area C | 2.1 | 2.2 | 2.3 | 2.3 | 2.6 | 3.4 | 3.1 | 4.8 | 3.8 | 2.9 | 2.3 | 4.2 |
| | Surface area D | 5.1 | 4.9 | 4.6 | 4.5 | 3.9 | 5.9 | 4.9 | 1.7 | 1.2 | 3.4 | 3.9 | 4.9 |
| | Surface area E | 7.1 | 6.4 | 5.8 | 5.5 | 4.7 | 5.5 | 4.9 | 4.0 | 3.2 | 3.8 | 4.2 | 5.7 |
| | Surface area F | 5.1 | 4.8 | 4.6 | 3.7 | 4.3 | 1.7 | 1.7 | 3.4 | 3.0 | 4.9 | 3.0 | 5.1 |
| | Surface area E + Surface area F | 12.2 | 11.2 | 10.4 | 9.2 | 9.0 | 7.2 | 6.6 | 7.4 | 6.2 | 8.7 | 7.2 | 10.8 |
| | (Surface areas: E + F) − (Surface areas: A + B) | 10.0 | 9.0 | 8.2 | 7.0 | 7.0 | 5.3 | 4.3 | 4.6 | 2.8 | 6.9 | 4.9 | 9.0 |
| | (Surface areas: D + E) − (Surface areas: B + C) | 9.5 | 8.3 | 7.2 | 6.7 | 4.9 | 7.4 | 5.6 | −1.1 | −1.9 | 3.2 | 4.7 | 5.0 |
| Outer layer core | Material | No. 1 | No. 1 | No. 1 | No. 1 | No. 1 | No. 1 | No. 1 | No. 1 | No. 1 | No. 1 | No. 2 | — |
| | Thickness (mm) | 1.32 | 1.32 | 1.32 | 1.32 | 1.32 | 1.32 | 1.33 | 1.32 | 1.32 | 1.32 | 1.24 | — |
| | Specific gravity | 0.96 | 0.96 | 0.96 | 0.96 | 0.96 | 0.96 | 0.96 | 0.96 | 0.96 | 0.96 | 1.12 | — |
| | Material hardness (Shore C) | 85 | 85 | 85 | 85 | 85 | 85 | 85 | 85 | 85 | 85 | 67 | — |
| | Material hardness (Shore D) | 55 | 55 | 55 | 55 | 55 | 55 | 55 | 55 | 55 | 55 | 40 | — |
| Entire core | Outer diameter (mm) | 38.91 | 38.91 | 38.91 | 38.93 | 38.92 | 38.91 | 38.91 | 38.91 | 38.91 | 38.91 | 37.68 | — |
| | Weight (g) | 34.9 | 34.9 | 34.9 | 34.9 | 34.9 | 35.8 | 35.8 | 35.8 | 35.8 | 34.9 | 33.5 | — |
| | Deflection (mm) | 3.4 | 3.6 | 3.8 | 4.0 | 4.2 | 3.6 | 3.9 | 4.2 | 4.6 | 4.3 | 4.3 | — |
| | Initial velocity (m/s) | 77.35 | 77.33 | 77.30 | 77.26 | 77.25 | 77.07 | 77.04 | 77.08 | 77.02 | 77.28 | 76.23 | — |
| | Surface hardness (Shore C) | 90 | 90 | 90 | 89 | 89 | 89 | 89 | 89 | 89 | 89 | 72 | — |
| | Surface hardness (Shore D) | 58 | 58 | 58 | 57 | 57 | 57 | 57 | 57 | 57 | 57 | 47 | — |
| Entire core surface hardness − Inner layer core center hardness (Shore C) | | 33 | 34 | 35 | 36 | 36 | 34 | 35 | 36 | 37 | 37 | 15 | — |
| Entire core surface hardness − Inner layer core surface hardness (Shore C) | | 4 | 6 | 8 | 9 | 10 | 6 | 9 | 12 | 15 | 12 | −7 | — |

TABLE 4

| | | Example | | | Comparative Example | | | | | | | | |
|---|---|---|---|---|---|---|---|---|---|---|---|---|---|
| | | 1 | 2 | 3 | 1 | 2 | 3 | 4 | 5 | 6 | 7 | 8 | 9 |
| Intermediate layer | Material | No. 3 | No. 3 | No. 3 | No. 3 | No. 3 | No. 4 | No. 4 | No. 4 | No. 4 | No. 3 | No. 5 | No. 3 |
| | Thickness (mm) | 1.08 | 1.08 | 1.08 | 1.07 | 1.07 | 1.08 | 1.06 | 1.07 | 1.08 | 1.08 | 1.30 | 1.51 |
| | Specific gravity | 1.09 | 1.09 | 1.09 | 1.09 | 1.09 | 0.95 | 0.95 | 0.95 | 0.95 | 1.09 | 0.95 | 1.09 |
| | Material hardness (Shore C) | 95 | 95 | 95 | 95 | 95 | 94 | 94 | 94 | 94 | 95 | 86 | 95 |
| | Material hardness (Shore D) | 69 | 69 | 69 | 69 | 69 | 67 | 67 | 67 | 67 | 69 | 57 | 69 |
| Intermediate layer-encased sphere | Outer diameter (mm) | 41.06 | 41.06 | 41.06 | 41.06 | 41.06 | 41.06 | 41.03 | 41.06 | 41.08 | 41.06 | 40.28 | 41.07 |
| | Weight (g) | 40.7 | 40.7 | 40.7 | 40.7 | 40.7 | 40.9 | 40.8 | 40.9 | 40.9 | 40.7 | 39.4 | 40.6 |
| | Deflection (mm) | 2.9 | 3.0 | 3.2 | 3.3 | 3.5 | 3.1 | 3.3 | 3.5 | 3.7 | 3.6 | 3.7 | 3.1 |
| | Initial velocity (m/s) | 77.82 | 77.83 | 77.83 | 77.86 | 77.84 | 77.83 | 77.91 | 77.70 | 77.88 | 77.81 | 76.95 | 77.69 |
| | Surface hardness (Shore C) | 97 | 97 | 97 | 97 | 97 | 97 | 97 | 97 | 97 | 97 | 93 | 98 |
| | Surface hardness (Shore D) | 71 | 71 | 71 | 71 | 71 | 71 | 71 | 72 | 71 | 71 | 63 | 71 |
| Intermediate layer-encased sphere surface hardness – inner layer core center hardness (Shore C) | | 40 | 41 | 42 | 44 | 44 | 42 | 43 | 44 | 45 | 45 | 36 | 44 |
| Intermediate layer-encased sphere surface hardness – entire core surface hardness (Shore C) | | 7 | 7 | 7 | 8 | 8 | 8 | 8 | 8 | 8 | 8 | 21 | — |
| Outer layer core thickness – intermediate layer thickness (mm) | | 0.24 | 0.24 | 0.24 | 0.25 | 0.25 | 0.24 | 0.26 | 0.25 | 0.24 | 0.24 | −0.06 | — |
| Cover | Material | No. 6 | No. 6 | No. 6 | No. 6 | No. 6 | No. 6 | No. 6 | No. 6 | No. 6 | No. 6 | No. 7 | No. 6 |
| | Thickness (mm) | 0.83 | 0.83 | 0.83 | 0.83 | 0.83 | 0.82 | 0.84 | 0.83 | 0.81 | 0.83 | 1.20 | 0.82 |
| | Specific gravity | 1.12 | 1.12 | 1.12 | 1.12 | 1.12 | 1.12 | 1.12 | 1.12 | 1.12 | 1.12 | 0.97 | 1.12 |
| | Material hardness (Shore C) | 66 | 66 | 66 | 66 | 66 | 66 | 66 | 66 | 66 | 66 | 96 | 66 |
| | Material hardness (Shore D) | 46 | 46 | 46 | 46 | 46 | 46 | 46 | 46 | 46 | 46 | 64 | 46 |
| Bal | Outer diameter (mm) | 42.72 | 42.72 | 42.72 | 42.72 | 42.72 | 42.71 | 42.72 | 42.71 | 42.7 | 42.72 | 42.68 | 42.71 |
| | Weight (g) | 45.5 | 45.5 | 45.5 | 45.5 | 45.5 | 45.6 | 45.7 | 45.6 | 45.6 | 45.5 | 45.3 | 45.3 |
| | Deflection (mm) | 2.7 | 2.8 | 2.9 | 3.1 | 3.2 | 2.7 | 3.1 | 3.2 | 3.5 | 3.3 | 3.2 | 2.8 |
| | Initial velocity (m/s) | 77.36 | 77.36 | 77.36 | 77.45 | 77.41 | 77.43 | 77.46 | 77.48 | 77.50 | 77.37 | 77.19 | 77.31 |
| | Surface hardness (Shore C) | 86 | 86 | 86 | 85 | 85 | 85 | 85 | 85 | 86 | 85 | 97 | 85 |
| | Surface hardness (Shore D) | 59 | 59 | 59 | 58 | 58 | 59 | 58 | 59 | 58 | 58 | 68 | 58 |
| Intermediate layer-encased sphere surface hardness – ball surface hardness (Shore C) | | 11 | 11 | 11 | 13 | 13 | 12 | 12 | 12 | 11 | 13 | −4 | 13 |
| Inner layer core diameter/ball diameter | | 0.849 | 0.849 | 0.849 | 0.849 | 0.849 | 0.849 | 0.849 | 0.849 | 0.849 | 0.849 | 0.825 | 0.891 |
| Intermediate layer thickness – cover thickness (mm) | | 0.25 | 0.25 | 0.25 | 0.24 | 0.24 | 0.25 | 0.22 | 0.25 | 0.27 | 0.25 | 0.10 | 0.68 |
| Specific gravity of cover material – specific gravity of intermediate layer | | 0.03 | 0.03 | 0.03 | 0.03 | 0.03 | 0.17 | 0.17 | 0.17 | 0.17 | 0.03 | 0.97 | 0.03 |
| Initial velocity relationship | Intermediate layer-encased sphere – ball (m/s) | 0.46 | 0.47 | 0.47 | 0.41 | 0.43 | 0.40 | 0.45 | 0.22 | 0.38 | 0.45 | −0.24 | 0.38 |
| | Intermediate layer-encased sphere – entire core (m/s) | 0.47 | 0.50 | 0.53 | 0.60 | 0.59 | 0.76 | 0.87 | 0.62 | 0.86 | 0.53 | 0.72 | 0.84 |
| | Entire core – inner layer core (m/s) | 0.87 | 0.90 | 0.92 | 0.93 | 0.98 | 0.86 | 0.87 | 1.09 | 1.03 | 1.06 | 0.04 | — |
| | Intermediate layer-encased sphere – inner layer core (m/s) | 1.34 | 1.40 | 1.45 | 1.53 | 1.57 | 1.62 | 1.74 | 1.71 | 1.89 | 1.59 | 0.76 | 0.84 |

The flight (W #1), the controllability on approach shots, and the durability on repeated impact of each golf ball are evaluated by the following methods. The results are shown in Table 5.

Evaluation of Flight (1)

A driver (W #1) is mounted on a golf swing robot, and a spin rate and a distance traveled (total) by a ball when struck at a head speed (HS) of 45 m/s are measured. The club used is a JGR/loft angle 9.5° (2016 model) manufactured by Bridgestone Sports Co., Ltd. The rating criteria are as follows.

[Rating Criteria]
Good: Total distance is 231.0 m or more
NG: Total distance is less than 231.0 m Evaluation of Flight (2)

The driver (W #1) is mounted on the golf swing robot, and the spin rate and the distance traveled (total) by the ball when struck at a head speed HS of 40 m/s are measured. The club used is a JGR/loft angle 9.5° (2016 model) manufactured by Bridgestone Sports Co., Ltd. The rating criteria are as follows.
[Rating Criteria]
  Good: Total distance is 197.0 m or more
  NG: Total distance is less than 197.0 m
Evaluation of Flight (3)
  The driver (W #1) is mounted on the golf swing robot, and the spin rate and the distance traveled (total) by the ball when struck at a head speed HS of 35 m/s are measured. The club used is a JGR/loft angle 9.5° (2016 model) manufactured by Bridgestone Sports Co., Ltd. The rating criteria are as follows.
[Rating Criteria]
  Good: Total distance is 168.0 m or more
  NG: Total distance is less than 168.0 m
Evaluation of Spin Rate on Approach Shots
  A judgment is made based on a spin rate when a sand wedge is mounted on the golf swing robot and the ball is struck at a head speed HS of 15 m/s. Similarly, a spin rate immediately after the ball is struck is measured by a device for measuring initial conditions. The sand wedge used is a TOURSTAGE TW-03 (loft angle 57°) 2002 model manufactured by Bridgestone Sports Co., Ltd.
[Rating Criteria]
  Good: Spin rate is 4,500 rpm or more
  NG: Spin rate is less than 4,500 rpm
Durability to Cracking on Repeated Impact
  A durability of the golf ball is evaluated using an ADC Ball COR Durability Tester produced by Automated Design Corporation (U.S.). The tester fires a golf ball pneumatically and causes it to repeatedly strike two metal plates installed in parallel, and the durability of the ball is an average value of the number of times of firing required until the ball cracks. In this case, the average value is a value obtained by preparing 10 balls of the same type and, by firing each ball, averaging the number of times of firing required until each of the 10 balls cracks. The tester is a horizontal COR type, and an incident velocity against the metal plates is set to 43 m/s.
[Rating Criteria]
  Good: Average value is at least 190 times
  NG: Average value is not more than 189 times As shown in the results in Table 5, the golf balls of Comparative Examples 1 to 9 are inferior in the following respects to the golf balls according to the present invention (Examples).

In Comparative Example 1, a deflection of the ball when compressed under a predetermined load is larger than 3.0 mm, and a distance when the ball is struck by a driver (W #1) at head speeds of 45 m/s and 40 m/s is inferior.

In Comparative Example 2, the deflection of the ball when compressed under a predetermined load is larger than 3.0 mm, and the distance when the ball is struck by the driver (W #1) at head speeds of 45 m/s and 40 m/s is inferior.

In Comparative Example 3, a value of (initial velocity of intermediate layer-encased sphere–initial velocity of entire core) is larger than 0.70 m/s, and a durability to cracking on repeated impact is inferior.

In Comparative Example 4, the deflection of the ball when compressed under a predetermined load is larger than 3.0 mm, the value of (initial velocity of intermediate layer-encased sphere–initial velocity of entire core) is larger than 0.70 m/s, the distance when the ball is struck by the driver (W #1) at a head speed of 45 m/s is inferior, and the durability to cracking on repeated impact is inferior.

In Comparative Example 5, the deflection of the ball when compressed under a predetermined load is larger than 3.0 mm, the distance when the ball is struck by the driver (W #1) at a head speed of 45 m/s is inferior, and the durability to cracking on repeated impact is inferior.

In Comparative Example 6, the deflection of the ball when compressed under a predetermined load is larger than 3.0 mm, the value of (initial velocity of intermediate layer-encased sphere–initial velocity of entire core) is larger than 0.70 m/s, the distance when the ball is struck by the driver (W #1) at a head speed of 45 m/s is inferior, and the durability to cracking on repeated impact is inferior.

In Comparative Example 7, the deflection of the ball when compressed under a predetermined load is larger than 3.0 mm, the distance when the ball is struck by the driver (W #1) at a head speed of 45 m/s is inferior, and the durability to cracking on repeated impact is inferior.

In Comparative Example 8, the deflection of the ball when compressed under a predetermined load is larger than 3.0 mm, the value of (initial velocity of intermediate layer-encased sphere–initial velocity of entire core) is larger than

TABLE 5

|  |  |  | Example | | | Comparative Example | | | | | | | | |
| --- | --- | --- | --- | --- | --- | --- | --- | --- | --- | --- | --- | --- | --- | --- |
|  |  |  | 1 | 2 | 3 | 1 | 2 | 3 | 4 | 5 | 6 | 7 | 8 | 9 |
| Flight | W#1 HS 45 m/s | Spin rate (rpm) | 3,005 | 2,970 | 2,936 | 2,894 | 2,871 | 2,858 | 2,802 | 2,776 | 2,746 | 2,863 | 2,708 | 3,042 |
|  |  | Total (m) | 232.8 | 232.1 | 231.4 | 230.6 | 230.1 | 232.3 | 230.4 | 230.3 | 228.9 | 227.8 | 230.4 | 232.0 |
|  |  | Rating | good | good | good | NG | NG | good | NG | NG | NG | NG | NG | good |
|  | W#1 HS 40 m/s | Spin rate (rpm) | 2,993 | 2,969 | 2,945 | 2,917 | 2,901 | 2,872 | 2,841 | 2,806 | 2,801 | 2,873 | 2,836 | 3,071 |
|  |  | Total (m) | 198.5 | 197.8 | 197.2 | 196.4 | 196.0 | 197.6 | 197.4 | 199.0 | 197.9 | 197.9 | 196.4 | 194.9 |
|  |  | Rating | good | good | good | NG | NG | good | good | good | good | good | NG | NG |
|  | W#1 HS 35 m/s | Spin rate (rpm) | 3,012 | 2,981 | 2,950 | 2,913 | 2,892 | 2,930 | 2,845 | 2,817 | 2,763 | 2,864 | 2,854 | 3,027 |
|  |  | Total (m) | 168.1 | 168.3 | 168.5 | 168.7 | 168.8 | 171.4 | 171.9 | 170.3 | 171.6 | 169.4 | 175.2 | 168.9 |
|  |  | Rating | good | good | good | good | good | good | good | good | good | good | good | good |
| Approach shots | SW HS 15 m/s | Spin rate (rpm) | 4,761 | 4,732 | 4,702 | 4,667 | 4,647 | 4,982 | 4,772 | 4,673 | 4,557 | 4,651 | 3,807 | 4,769 |
|  |  | Rating | good | good | good | good | good | good | good | good | good | good | NG | good |
| Durability to cracking on repeated impact |  | Number of cracks | 219 | 207 | 195 | 180 | 172 | 171 | 136 | 108 | 95 | 160 | 134 | 163 |
|  |  | Rating | good | good | good | good | NG | NG | NG | NG | NG | NG | NG | NG |

0.70 m/s, a value of (initial velocity of entire core−initial velocity of inner layer core) is smaller than 0.20 m/s, the distance when the ball is struck by the driver (W #1) at head speeds of 45 m/s and 40 m/s is inferior, a spin rate of the ball on approach shots is low, and the durability to cracking on repeated impact is inferior.

Comparative Example 9 has a three-piece structure without an outer layer core, in which the value of (initial velocity of intermediate layer-encased sphere−initial velocity of entire core) is larger than 0.70 m/s, the distance when struck by the driver (W #1) at a head speed of 40 m/s is inferior, and the durability to cracking on repeated impact is inferior.

Japanese Patent Application No. 2022-152311 is incorporated herein by reference. Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A multi-piece solid golf ball comprising a multi-layer core each having at least an inner layer core and an outer layer core, a single-layer intermediate layer, and a single-layer cover, wherein the inner layer core is formed of a rubber composition, the intermediate layer and the cover are both formed of a resin composition, and a relationship among an initial velocity of the inner layer core, an initial velocity of an entire core, an initial velocity of a sphere (intermediate layer-encased sphere) obtained by encasing core with the intermediate layer, and an initial velocity of a sphere (ball) obtained by encasing the intermediate layer-encased sphere with the cover satisfies the following three conditions:

(initial velocity of ball)<(initial velocity of intermediate layer-encased sphere)

(initial velocity of intermediate layer-encased sphere)−(initial velocity of entire core)≤0.70 (m/s)

(initial velocity of entire core)−(initial velocity of inner layer core)≥0.20 (m/s)

and a specific gravity of the intermediate layer is at least 1.05, and a deflection (mm) when the golf ball is compressed under a final load of 1,275 N (130 kgf) from an initial load of 98 N (10 kgf) is not more than 3.0 mm, and
wherein the following condition is satisfied:

1.00≤(initial velocity of intermediate layer-encased sphere)−(initial velocity of inner layer core) ≤1.60 (m/s).

2. The multi-piece solid golf ball of claim 1, wherein the following condition is satisfied:
0.50≤(initial velocity of entire core)−(initial velocity of inner layer core)≤1.00 (m/s).

3. The multi-piece solid golf ball of claim 1, wherein the following condition is satisfied:

ball surface hardness<surface hardness of intermediate layer-encased sphere>outer layer core surface hardness>inner layer core surface hardness (where the surface hardness of each sphere means Shore C hardness).

4. The multi-piece solid golf ball of claim 1, wherein the intermediate layer contains an inorganic particulate filler.

5. The multi-piece solid golf ball of claim 1, wherein a difference between a specific gravity of the cover and the specific gravity of the intermediate layer is not more than 0.15.

6. The multi-piece solid golf ball of claim 1, wherein the resin composition of the intermediate layer contains a high-acid ionomer resin having an acid content of at least 16 wt %.

7. The multi-piece solid golf ball of claim 1, wherein the outer layer core is formed of a resin composition.

8. The multi-piece solid golf ball of claim 1, wherein the following condition is satisfied:

cover thickness<intermediate layer thickness≤outer layer core thickness.

9. The multi-piece solid golf ball of claim 1, wherein the core has a hardness profile in which, letting Cc be a Shore C hardness at the center of the core, $C_m$ be a Shore C hardness at a midpoint M between the center and the surface of the core, Cm−2, Cm−4, and Cm−6 be respective Shore C hardnesses at positions 2 mm, 4 mm, and 6 mm inward from the midpoint M, Cm+2, Cm+4, and Cm+6 be respective Shore C hardnesses at positions 2 mm, 4 mm, and 6 mm outward from the midpoint M, and Cs be a Shore C hardness at the surface of the core, the following surface areas A to F are defined:

½×2×(Cm−4−Cm−6)  surface area A:

½×2×(Cm−2−Cm−4)  surface area B:

½×2×(Cm−Cm−2)  surface area C:

½×2×(Cm+2−Cm)  surface area D:

½×2×(Cm+4−Cm+2)  surface area E:

½×2×(Cm+6−Cm+4)  surface area F:

and the following condition is satisfied:

(surface area E+surface area F)−(surface area A+surface area B)≥1.0.

10. The multi-piece solid golf ball of claim 1, wherein the following formula is satisfied:

[surface hardness of intermediate layer-encased sphere(Shore C)−center hardness of inner layer core(Shore C)]≥35.

* * * * *